United States Patent
Kano

[11] Patent Number: 5,909,676
[45] Date of Patent: Jun. 1, 1999

[54] SYSTEM FOR CONTROLLING AN OBJECT AND MEDIUM USING NEURAL NETWORKS

[75] Inventor: Makoto Kano, Urayasu, Japan

[73] Assignee: Kabushiki Kaisha Toshiba, Japan

[21] Appl. No.: 08/807,160

[22] Filed: Feb. 27, 1997

[30] Foreign Application Priority Data

Feb. 29, 1996 [JP] Japan ................................. P8-043665

[51] Int. Cl.$^6$ ................................................. G06F 15/18
[52] U.S. Cl. ................................ 706/25; 706/15; 706/16; 706/23
[58] Field of Search ................................. 395/23, 21, 22, 395/24; 706/15, 16, 23, 25, 26, 14

[56] References Cited

U.S. PATENT DOCUMENTS 5,129,038  7/1992  Kobda et al. ............................... 706/25
5,630,020  5/1997  Makram-Ebeid ........................... 706/25

FOREIGN PATENT DOCUMENTS 4-30280   2/1992  Japan ................................. G06G 7/60
4-360291  12/1992  Japan ................................. G06G 7/60

*Primary Examiner*—Tariq R. Hafiz
*Assistant Examiner*—Jason W. Rhodes
*Attorney, Agent, or Firm*—Finnegan, Henderson, Farabow, Garrett & Dunner, L.L.P.

[57] ABSTRACT

A function for compensating an error between a teacher signal and an output signal with a weight value is defined. A multilayered neural network is changed so that the function becomes minimum. Thus, the multilayered neural network can be adaptively controlled.

21 Claims, 17 Drawing Sheets

POSITION(x COORDINATE)

POSITION(y COORDINATE)

DIRECTION

VELOCITY(x COORDINATE)

VELOCITY(y COORDINATE)

ANGULAR VELOCITY

FORCE(x COORDINATE)

FORCE(y COORDINATE)

TORQUE

POSITION(x COORDINATE)

POSITION(y COORDINATE)

DIRECTION

VELOCITY(x COORDINATE)

VELOCITY(y COORDINATE)

ANGULAR VELOCITY

FORCE(x COORDINATE)

FORCE(y COORDINATE)

TORQUE

SYSTEM FOR CONTROLLING AN OBJECT AND MEDIUM USING NEURAL NETWORKS

BACKGROUND OF THE INVENTION

1. Field of the Invention

The present invention relates to a controlling apparatus for use with controlling, recognizing, diagnosing processes, and so forth for an object, a method thereof, and a medium having a program for accomplishing the method thereof.

2. Description of the Related Art

Conventionally, to control a multilayered neural network, error back propagation method has been used.

In the error back propagation method, with respect to data $(p^n, t^n)$ (where $n=1, 2, \ldots, N$; N is the number of sets) that is a set of an input signal $p^n=(p_1^n, p_2^n, \ldots p_{m1}^n)$ (where m1 is the number of dimensions) and a teacher signal $t^n=(t_1^n, t_n^2, \ldots, t_{m3}^n)$ (where m3 is the number of dimensions), the input signal $p^n$ is calculated in the forward direction and an output signal $o^n=(o_1^n, o_2^n, \ldots, o_{m3}^n)$ is obtained. The square sum of an error between the output signal $o^n$ and the teacher signal $t^n$ is obtained and multiplied by ½. The result is defined as an error function of an n-th data set, $E^n$. The average of all data sets is defined as an error function E.

$$E = \frac{1}{N} \sum_{n=1}^{N} E^n,$$

$$E^n = \frac{1}{2} \sum_{k=1}^{m3} (t_k^n - o_k^n)^2$$

The connection weight of the multilayered neural network is repeatedly corrected in such a manner that the error function E becomes minimum. When the value of the error function E decreases to a predetermined value, the correction of the connection weight of the multilayered neural network is stopped.

For example, the following problems can be input to the multilayered neural network.

Problem 1) The ranges of errors between teacher signals and output signals have been designated. Errors between teacher signals and output signals of individual units in the output layer should be converged to predetermined ranges.

Problem 2) When an error between teacher signal and output signal of one of units in the output layer is converged to a predetermined range, errors between teacher signals and output signals of the other units can be deviated from predetermined ranges.

Problem 3) When ranges of errors between teacher signals and output signals of individual units in the output layer have been designated to a predetermined range, the errors between teacher signals and output signals should be converged to the predetermined range.

As described above, in the conventional controlling method, an error function for equally dealing with errors between teacher signals and output signals of units in the output layer is evaluated. When the value of the error function decreases to a predetermined value, the correction of the connection weight of the multilayered neural network is stopped.

Thus, with respect to the problem 1, if the ranges of the errors between teacher signals and output signals of units in the output layer are largely different, although an error between teacher signal and output signal of a unit with a small error range has not been converted to a predetermined range, the correction of the connection weight of the multilayered neural network may be stopped. In the case that the designated value of the error function is small and errors between teacher signals and output signals of all the units are converged to predetermined ranges, since the connection weight of the multilayered neural network is repeatedly corrected until the errors of output signals and teacher signals of unit with large ranges become small, the number of times of the correcting process increases.

With respect to the problem 2, when the error between the output signal and the teacher signal of a particular unit is sufficiently small, although the error between teacher signal and output signal of the unit has been converged to the predetermined range, since errors between teacher signals and output signals of the other units do not have predetermined respective ranges, the stop condition of the correction of the connection weight is not satisfied. Thus, the number of times of the correcting process increases. In addition, since the connection weight is corrected so as to converge the error between teacher signal and output signal of a unit to a predetermined range, the connection weight of the units continuously varies. Thus, an error between output signal and teacher signal of a unit with a small error between an output signal and a teacher signal is not converged to a predetermined range.

With respect to the problem 3, since the error between the output signal and the teacher signal of each unit in the output layer does not always constantly vary, there are two types of units of which errors between output signals and teacher signals of some units sharply vary, whereas errors of other units do not almost vary. In other words, since errors between output signals and teacher signals vary in individual units, it is difficult to converge errors between output signals and teacher signals of units in the output layer to predetermined ranges.

As technologies that deal with the above-described problems, the following related art references are known.

1) Japanese Patent Laid-Open Application No. 4-30280

In this related art reference, the absolute value of an error E between output data O of each output node in the output layer of the neural network and teacher data T corresponding to the output data O is compared with a threshold value a. If the absolute value of the error E is smaller than the threshold value a, the value of the error E of the output node is reset to "0". When the absolute value of the error E is larger than the threshold value a, the value of the error E of the output node is used as it is. Thus, the connection weight can be prevented from being unnecessarily corrected due to an output node with a small value of the error E.

2) Japanese Patent Laid-Open Application 4-360291

In this related art reference, an error between a output $y_k^o$ of each output node in the output layer of the neural network and a similarity (teacher data) $y'_k$ is multiplied by a term that varies corresponding to the similarity (the term is the similarity or the square thereof). The result is defined as an error function E. The connection weight of the neural network is corrected in such a manner that the error function E becomes minimum. In other words, as the coefficient of the error function, the similarity or the square thereof is used. In this system, when the similarity is large, the evaluation of error between the output $y_k^o$ and the similarity $y'_k$ is increased. When the similarity is small, the evaluation of error is decreased. Thus, the amount of variation of the connection weight of the neural network corresponding to an output signal with a large similarity is increased. The amount of variation of the connection weight of the neural network corresponding to an output signal with a small similarity is decreased.

The present invention is made from another point of view of the above-described related art references. An object of the present invention is to provide a controlling apparatus for executing an adaptive controlling process.

Another object of the present invention is to provide a controlling method for executing an adaptive controlling process.

A further object of the present invention is to provide a medium having a program for accomplishing a controlling method for executing an adaptive controlling process.

SUMMARY OF THE INVENTION

The present invention is a controlling apparatus comprising a multilayered neural network for designating a range of an error between a teacher signal and an output signal, calculating the error between the teacher signal and the output signal received from the multilayered neural network, designating a weight corresponding to the range, defining a function for compensating the error corresponding to the designated weight, and changing the multilayered neural network so that the function becomes minimum.

The present invention is a controlling apparatus comprising a multilayered neural network, calculating an error between a teacher signal and the output signal received from the multilayered neural network, designating a weight corresponding to the error, defining a function for compensating the error corresponding to the designated weight, and changing the multilayered neural network so that the function becomes minimum.

The present invention is a controlling method, comprising the steps of designating an error between a teacher signal and an output signal received from a multilayered neural network, supplying an output signal from the multilayered neural network, calculating an error between a teacher signal and the output signal, designating a weight corresponding to the designated range, defining a function for compensating the calculated errors with the designated weight, and changing the multilayered neural network so that the defined function becomes minimum.

The present invention is a controlling method, comprising the steps of supplying an output signal from a multilayered neural network, calculating an error between a teacher signal and the output signal, designating a weight corresponding to the calculated error, defining a function for compensating the calculated error with the designated weight, and changing the multilayered neural network so that the defined function becomes minimum.

The present invention is a medium having a program, comprising the steps of designating a range of an error between a teacher signal and an output signal received from a multilayered neural network, supplying an output signal from the multilayered neural network, calculating an error between a teacher signal and the output signal, designating a weight corresponding to the designated range, defining a function for compensating the calculated errors with the designated weight, and changing the multilayered neural network so that the defined function becomes minimum.

The present invention is a medium having a program, comprising the steps of supplying an output signal from a multilayered neural network, calculating an error between a teacher signal and the output signal, designating a weight corresponding to the calculated error, defining a function for compensating the calculated error with the designated weight, and changing the multilayered neural network so that the defined function becomes minimum.

The error back propagation method is one type of a supervised learning method for a hierarchical neural network with a predetermined number of intermediate layers disposed between an input layer and an output layer. In this method, the minimum point of a problem of minimum value of a square error function in a connection weight vector space is obtained by most sharply drop method using a slope of the error function. The present invention can be applied for any neural network as long as it is reduced to a hierarchical neural network.

In the hierarchical neural network, units that compose the network are categorized as input units, output units, and if necessary intermediate units disposed therebetween. These units are disposed in an input layer, an output layer, and an intermediate layer. In a hierarchical neural network that does not have an intermediate layer, each unit in the input layer is connected to part or all units in the output layer. On the other hand, in a hierarchical neural network having an intermediate layer, each unit in the input layer is connected to part or all units in the intermediate layer. Each unit in the intermediate layer is connected to part or all units in another intermediate layer and finally connected to part or all units in the output layer. Although each layer is composed of a proper number of units, each unit is not connected in the same layer. Each unit receives an input signal from a just preceding layer and sends an output signal to a just following layer. Thus, in the hierarchical neural network, when the input layer receives input signals from the outside, an intermediate layer receives signals from the input layer and a lower intermediate layer and sends output signals to a higher intermediate layer and the output layer. The output layer sends an output signal to the outside of the neural network. Although units in the input layer send received signals as they are, units in the intermediate layers and the output layer normally use non-linear output functions referred to as semi-linear devices rather than devices with threshold values.

The error back propagation method is applied for a hierarchical neural network so that when sets of input signals and teacher signals corresponding thereto are supplied, the connection weight of the units of the neural network is corrected in such a manner that the output signals of the neural network accord with the supplied teacher signals. The error back propagation method for the hierarchical neural network can be summarized as follows.

1) Sets of input signals and teacher signals corresponding thereto are designated.

2) Input signals and output signals of individual units are calculated in the order of an input layer, intermediate layers, and an output layer.

3) A square error between a teacher signal and a real output signal is calculated.

4) The connection weight of units of the neural network is corrected in the order from the output layer to the input layer so that the obtained square error becomes minimum.

5) When the square error of each input signal becomes a predetermined value or smaller, the correction of the connection weight is completed. When the square error is not smaller than the predetermined value, the steps 2) to 4) are repeated.

The most remarkable feature of the controlling method according to the present invention is in that a square error between a teacher signal and a real output signal is properly designated a weight corresponding to a problem, a situation, and so forth. In other words, since the connection weight, the threshold value, and so forth of units of the multilayered neural network can be designated corresponding to a problem, a situation, and so forth, the multilayered neural network can be adaptively controlled. Thus, to adaptively control the multilayered neural network, weights are designated in such a manner that the connection weight, threshold value, and so forth of units of the multilayered neural network are adapted for the problem, situation, and so forth. In the controlling method of the present invention, as a criterion for designating a weight, an error between a teacher signal and an output signal is used.

For example, when the problems 1) to 3) above are accomplished in such a manner that the number of times of the correction of the connection weight is decreased, as a weight, a value proportional to the inverse number of the error between a teacher signal and an output signal, a value proportional to the inverse number of the square of the error, a value proportional to the inverse number of the absolute value of the error, a value proportional to the square of the error, or a value proportional to the absolute value of the error can be designated. In other words, as a weight, when a value proportional to the inverse number of the error between a teacher signal and an output signal, a value proportional to the inverse number of the square of the error, a value proportional to the inverse number of the absolute value of the error, a value proportional to the square of the error, or a value proportional to the absolute value of the error is designated, the connection weight, the threshold value, and so forth of units of the multilayered neural network are corrected so that the number of times of the correction of the connection weight is decreased. Thus, the multilayered neural network is adaptively controlled.

Consequently, as is clear from the above description, since the controlling apparatus according to the present invention adaptively controls the multilayered neural network, it can be applied for many fields.

Generally, when the error back propagation method is applied, as an output function, a non-linear function, in particular, a logistic function, is used. In the controlling method of the present invention, it is preferable to use a logistic function as a non-linear output function. This is because when a logistic function is used as an output function, the variation of the error between a teacher signal and an output signal can be calculated with output signals of units in the intermediate layers and the output layer.

Next, a neural network that can be reduced to a multilayered neural network will be described. A recurrent neural network, of which a feedback function is added to the multilayered neural network, is a non-hierarchical neural network that can deal with temporal-spatial information. However, since the recurrent neural network can be treated as a hierarchical neural network corresponding to discrete time, the error back propagation method can be applied. This method is referred to as back propagation through time method. In this method, dynamics of the neural network are calculated from time $t_0$ to time t. Past input signals, past output signals, and the value of connection weight are stored. Thereafter, errors are calculated from time t to time t0. In other words, in the case of a discrete time model, the back propagation through time method is equivalent to a method of which the recurrent neural network is treated as a hierarchical neural network and the error back propagation method is applied. Thus, even if the multilayered neural network does not physically have a hierarchical structure, as long as it can be treated as a hierarchical neural network, it can be treated as a multilayered neural network in the present invention.

In the error back propagation method according to the present invention, a sequential correcting method of which the connection weight is corrected corresponding to each input signal or a connection weight correcting method referred to as on-line mode can be used. Alternatively, batch correcting method of which the correction amount of the connection weight corresponding to each input signal is stored and the connection weight is corrected on batch basis may be used. In addition, the error back propagation method involves a problem of symmetry breaking that spoils the intermediate layer. However, this problem can be solved by designating a small random number as the initial value of the connection weight. In addition, it is not necessary that all connection weights of individual units are variables. In other words, when some connection weights are constants, they are not corrected. The error back propagation method is applied for only connection weights that are variables.

Moreover, according to the present invention, any medium that has a program for accomplishing the learning method according to the present invention can be used.

These and other objects, features and advantages of the present invention will become more apparent in light of the following detailed description of a best mode embodiment thereof, as illustrated in the accompanying drawings.

DESCRIPTION OF THE PREFERRED EMBODIMENTS

Next, embodiments of the present invention will be described.

Figure 1:
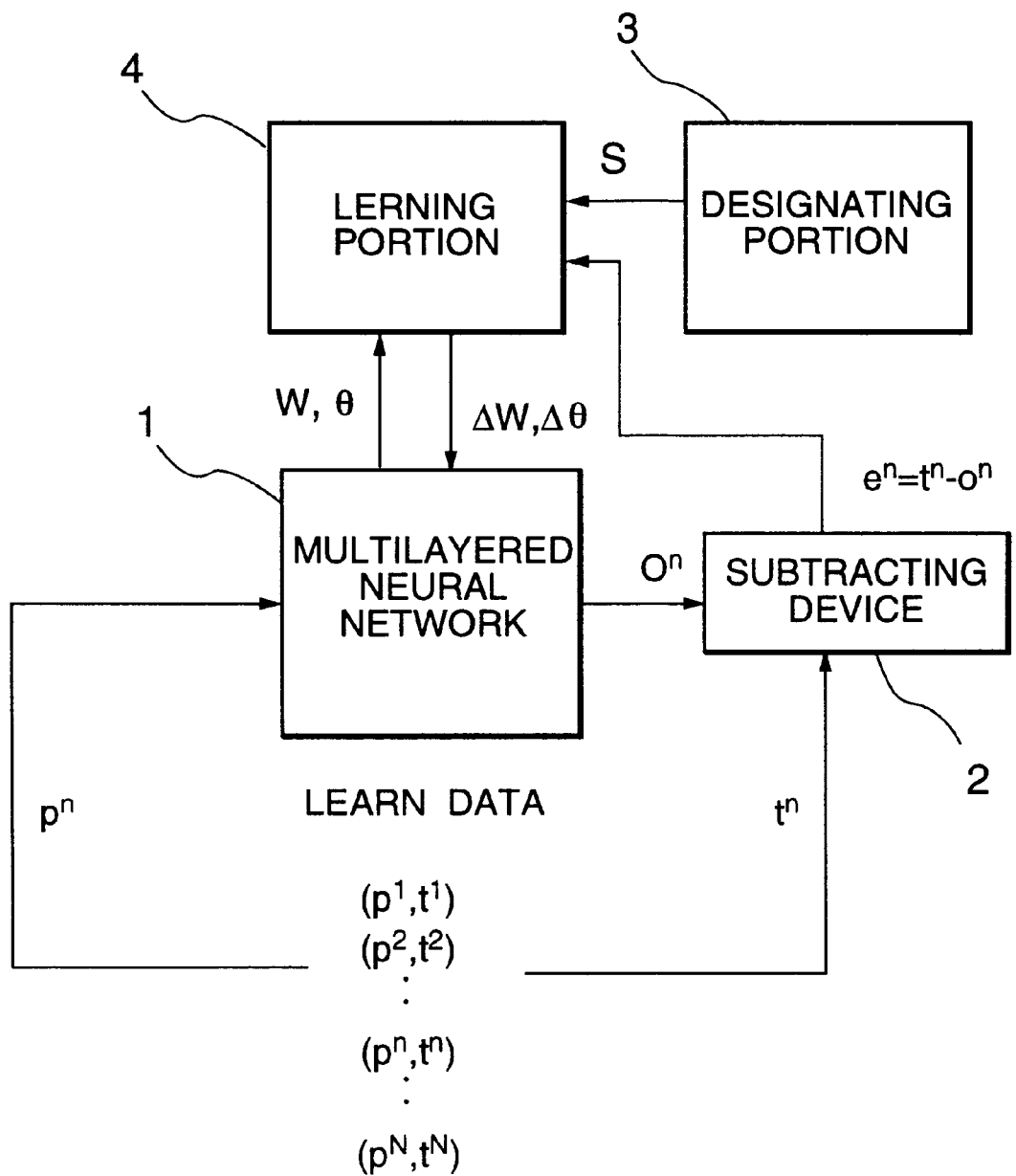
FIG. 1 is a block diagram showing the structure of a controlling apparatus according to an embodiment of the present invention.

FIG. 1 is a block diagram showing the structure of a controlling apparatus according to an embodiment of the present invention.

In FIG. 1, a multilayered neural network 1 receives an input signal $p^n$ of learning data ($p^n$, $t^n$) (where n=1, 2, ..., N; N represents the number of sets of learning data). The learning data ($p^n$, $t^n$) is composed of sets of input signals and teacher signals. The multilayered neural network 1 calculates an output signal $o^n$ corresponding to a connection weight value w and a threshold value θ in the forward direction, and outputs it to a subtracting device 2.

The subtracting device 2 receives the output signal $o^n$ of the multilayered neural network 1 and the teacher signal $t^n$ of the learning data, subtracts the output signal $o^n$ from the teacher signal $t^n$, and supplies the error $e^n = t^n - o^n$ to a learning portion 4. On the other hand, the designating portion 3 designates the value of a weight s and outputs it to the learning portion 4. The learning portion 4 calculates a correction amount Δw of the connection weight value of the multilayered neural network 1 and a correction amount Δθ of the threshold value θ corresponding to the weight s received from the designating portion 3, errors ($e^1$, $e^2$, ..., $e^N$) for all the learning data received from the subtracting device 2, and the connection weight value w and the threshold value θ received from the multilayered neural network 1, and supplies the correction amounts Δw and Δθ to the multilayered neural network 1.

The multilayered neural network 1 corrects the connection weight amount w and the threshold value θ corresponding to the correction amount Δw of the connection weight value and the correction amount Δθ of the threshold value received from the learning portion 4.

In such a manner, the connection weight value w and the threshold value θ of the multilayered neural network 1 are repeatedly corrected. Thus, the multilayered neural network 1 learns data so that it outputs the output signal $o^n$ similar to the teacher signal $t^n$.

Figure 2:
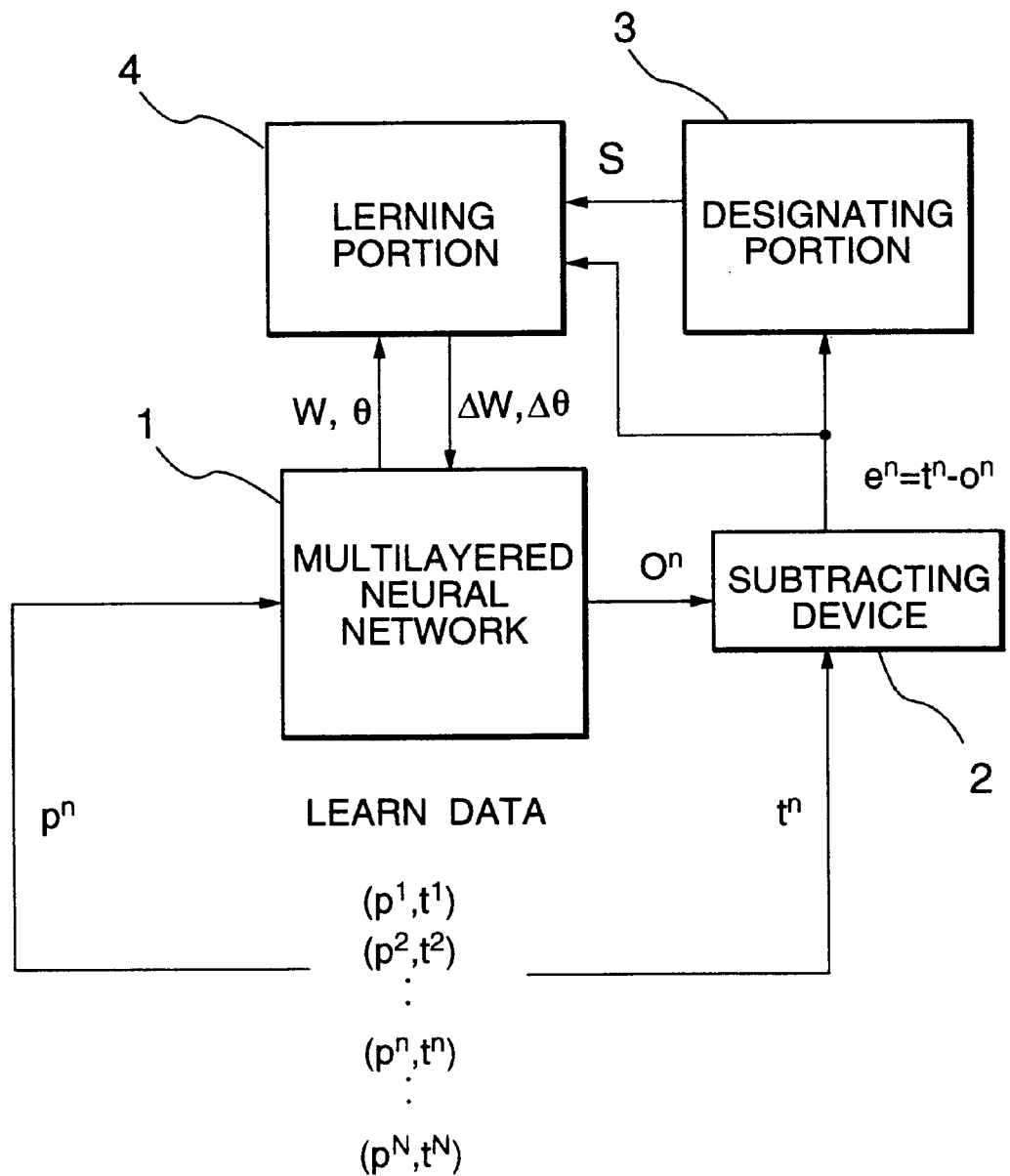
FIG. 2 is a block diagram showing the structure of a controlling apparatus according to another embodiment of the present invention.

FIG. 2 is a block diagram showing the structure of a controlling apparatus according to another embodiment of the present invention. In the controlling apparatus, a designating portion 3 designates the value of a weight s corresponding to errors ($e^1$, $e^2$, ..., $e^N$) received from a subtracting device 2 and supplies the value of the weight s to a learning portion 4. The other structure of the controlling apparatus shown in FIG. 2 is the same as that shown in FIG. 1.

Figure 3:
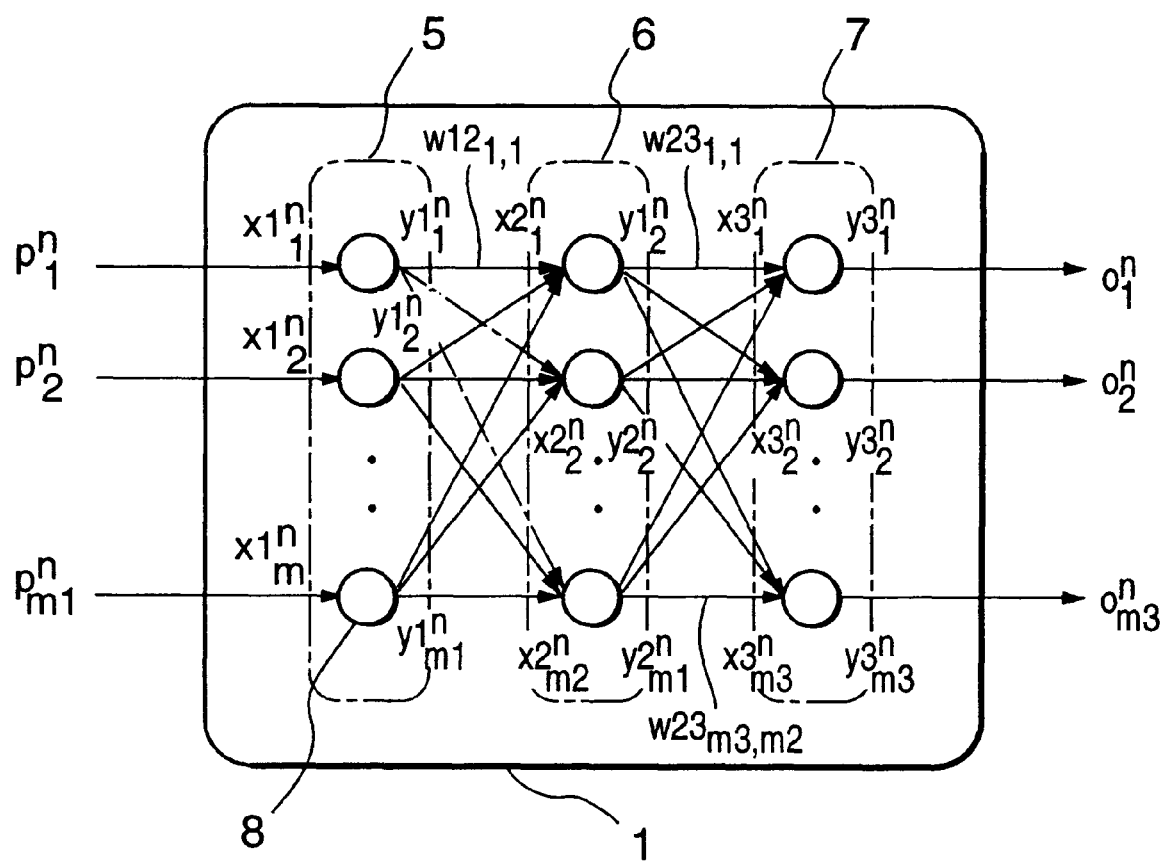
FIG. 3 is a schematic diagram showing a neural network with one intermediate layer.

Next, with an example of which the multilayered neural network 1 has one intermediate layer as shown in FIG. 3, a controlling apparatus and a controlling method according to the present invention will be described.

The multilayered neural network 1 has an input layer 5, an intermediate layer 6, and an output layer 7. In this case, it is assumed that the number of units 8 in the input layer 5 is m1; the number of units 8 in the intermediate layer 5 is m2; and the number of units 8 in the output layer 7 is m3 (where m1, m2, and m3 are positive integers).

An input signal $p^n$ is a vector having m1 elements.

$$p^n = (p_1^n, p_2^n, \ldots, p_{m1}^n)$$

A teacher signal $t^n$ is a vector having m3 elements.

$$t^n = (t_1^n, t_2^n, \ldots, t_{m3}^n)$$

The input signal $p^n$ is supplied to the multilayered neural network 1. The multilayered neural network 1 calculates an output signal in the forward direction.

It is assumed that input/output functions of units in the intermediate layer 6 of the multilayered neural network 1 are sigmoid functions f(x)=1/(1+exp (−x)), whereas input/output functions of units 8 in the input layer 5 and the output layer 7 are identity functions. Thus, when an n-th input signal $p^n$ is supplied to the multilayered neural network 1, it is calculated in the forward direction as follows.

$$x1_i^n = p_i^n,$$

$$y1_i^n = x1_i^n \ (i = 1, 2, \ldots, m1),$$

$$x2_j^n = \sum_{i=1}^{m1} w12_{j,i} y1_i^n - \theta 2_j,$$

$$y2_j^n = \frac{1}{1 + \exp(-x2_j^2)} \ (j = 1, 2, \ldots, m2),$$

$$x3_k^n = \sum_{j=1}^{m2} w23_{k,j} y2_j^n - \theta 3_k,$$

$$y3_k^n = x3_k^n,$$

$$o_k^n = y3_k^n \ (k = 1, 2, \ldots, m3),$$

$$o^n = (o_1^n, o_2^n, \ldots, o_{m3}^n).$$

where $x1_i^n$ is an input value of an i-th unit in the input layer in the case that an n-th input signal is received; $y1_i^n$ is an output value of an i-th unit in the input layer in the case that an n-th input signal is received; $x2_j^n$ is an input value of an j-th unit in the intermediate layer in the case that an n-th input signal is received; $\theta 2_j$ is a threshold value of a j-th unit in the intermediate layer; $w12_{j,i}$ is a connection weight value of an i-th unit in the input layer and a j-th unit in the intermediate layer; $y2_j^n$ is an output value of a j-th unit in the intermediate layer in the case that an n-th input signal is received; $x3_k^n$ is an input value of a k-th unit in the output layer in the case that an n-th input signal is received; $\theta 3_k$ is a threshold value of a k-th unit in the output layer; $w23_{k,j}$ is a connection weight value of a j-th unit in the intermediate layer and a k-th unit in the output layer; $y3_k^n$ is an output value of a k-th unit in the output layer in the case that an n-th input signal is received; $o_k^n$ is a k-th output signal in the output layer in the case that an n-th input signal is received.

The subtracting device 2 receives the output signal $o^n$ that have been calculated by the multilayered neural network 1 and the teacher signal $t^n$, and outputs the error $e^n$ of which the output signal $o^n$ is subtracted from the teacher signal $t^n$.

$$e^n = (e_1^n, e_2^n, \ldots, e_{m3}^n),$$

$$e_k^n = t_k^n - o_k^n \quad (k=1, 2, \ldots, m3)$$

The designating portion 3 designates the weight $s=(s_1, s_2, \ldots, s_{m3})$. The real weight designating method will be described later.

The learning portion 4 calculates the correction value $\Delta w$ of the connection weight and the correction among $\Delta\theta$ of the threshold value corresponding to the error $(e^1, e^2, \ldots, e^N)$ received from the subtracting device 2, the weight s received from the designating portion 3, and the connection weight value w and the threshold value $\theta$ received from the multilayered neural network 1. In this case, the error function E is defined as follows.

$$E = \frac{1}{N} \sum_{n=1}^{N} E^n,$$

$$E^n = \frac{1}{2} \frac{\sum_{k=1}^{m3} s_k (e_k^n)^2}{\sum_{l=1}^{m3} s_l}$$

The correction value $\Delta w$ of the connection weight value and the correction amount $\Delta\theta$ of the threshold value are obtained so that the error function E becomes minimum. This calculation method is the same as the error back propagation method. However, they differ in defining error functions. Thus, the state of the multilayered neural network 1 vary in each method. The state of the multilayered neural network 1 will be calculated by the following formula.

$$\Delta w23_{k,j} = -\epsilon \frac{\partial E}{\partial w23_{k,j}}$$

$$= \frac{-\epsilon}{2N} \frac{s_k}{\sum_{l=1}^{m3} s_l} \sum_{n=1}^{N} \frac{\partial (e_k^n)^2}{\partial y3_k^n} \frac{d y3_k^n}{d x3_k^n} \frac{\partial x3_k^n}{\partial w23_{k,j}}$$

$$= \frac{\epsilon}{N} \frac{s_k}{\sum_{l=1}^{m3} s_l} \sum_{n=1}^{N} e_k^n y2_j^n$$

$(j = 1, 2, \ldots, m2; k = 1, 2, \ldots, m3)$ $$\Delta\theta 3k = -\epsilon \frac{\partial E}{\partial \theta 3_k}$$

$$= \frac{-\epsilon}{2N} \frac{s_k}{\sum_{l=1}^{m3} s_l} \sum_{n=1}^{N} \frac{\partial (e_k^n)^2}{\partial y3_k^n} \frac{d y3_k^n}{d x3_k^n} \frac{\partial x3_k^n}{\partial \theta 3_k}$$

$$= \frac{-\epsilon}{N} \frac{s_k}{\sum_{l=1}^{m3} s_l} \sum_{n=1}^{N} e_k^n$$

$(k = 1, 2, \ldots, m3)$ $$\Delta w12_{j,i} = -\epsilon \frac{\partial E}{\partial w12_{j,i}}$$

$$= \frac{-\epsilon}{2N} \sum_{n=1}^{N} \sum_{k=1}^{m3} \frac{s_k}{\sum_{l=1}^{m3} s_l} \frac{\partial (e_k^n)^2}{\partial y3_k^n} \frac{d y3_k^n}{d x3_k^n} \frac{\partial x3_k^n}{\partial y2_j^n} \frac{d y2_j^n}{d x2_j^n} \frac{\partial x2_j^n}{\partial w12_{j,i}}$$

$$= \frac{\epsilon}{N} \sum_{n=1}^{N} \sum_{k=1}^{m3} \frac{s_k}{\sum_{l=1}^{m3} s_l} e_k^n w23_{k,j} y2_j^n (1 - y2_j^n) y1_i^n$$

$(i = 1, 2, \ldots, m1; k = 1, 2, \ldots, m2)$, $$\Delta\theta 2_j = -\epsilon \frac{\partial E}{\partial \theta 2_j}$$

$$= \frac{-\epsilon}{2N} \sum_{n=1}^{N} \sum_{k=1}^{m3} \frac{s_k}{\sum_{l=1}^{m3} s_l} \frac{\partial (e_k^n)^2}{\partial y3_k^n} \frac{d y3_k^n}{d x3_k^n} \frac{\partial x3_k^n}{\partial y2_j^n} \frac{d y2_j^n}{d x2_j^n} \frac{\partial x2_j^n}{\partial \theta 2_j}$$

$$= \frac{-\epsilon}{N} \sum_{n=1}^{N} \sum_{k=1}^{m3} \frac{s_k}{\sum_{l=1}^{m3} s_l} e_k^n w23_{k,j} y2_j^n (1 - y2_j^n)$$

$(j = 1, 2, \ldots, m2)$, where $\Delta w23_{k,j}$ is the correction amount of the connection weight value of a j-th unit in the intermediate layer and a k-th unit in the output layer; $\Delta\theta 3_k$ is the correction amount of the threshold value of a k-th unit in the output layer; $\Delta w12_{j,i}$ is the correction amount of the connection weight value of an i-th unit in the input layer and a j-th unit in the intermediate layer; $\Delta\theta 2_j$ is the correction amount of the threshold value of a j-th unit in the intermediate layer; and $\epsilon$ is a learning coefficient with a small positive value. These correction amounts are supplied to the multilayered neural network 1. The multilayered neural network 1 adds the correction amounts to the connection weight value and the threshold value that have not been corrected.

Next, the weight designating method of the designating portion 3 will be described with an example of the above-described three problems.

As with the problem 1, in the case that the ranges of errors between teacher signals and output signals of the multilayered neural network have been designated and errors between teacher signals and output signals received from units in the output layer should be converged to predetermined ranges, a value proportional to the inverse number of the range $\eta = (\eta_1, \eta_2, \ldots, \eta_{m3})$ is treated as the weight s.

$$s=(s_1, s_2, \ldots, s_{m3})$$

$$s_k=\alpha(1/\eta_k) \text{ (where } k=1, 2, \ldots, m3)$$

where α is a positive constant.

As with the problem 2, in the case that as long as the error between teacher signal and output signal of a unit in the output layer is converged to a predetermined range, error between teacher signal and output signal of units in the output layer can be deviated from the predetermined ranges, the square of the error between the teacher signal and the output signal for each unit in the output layer is compared. A weight value is designated to each unit in such a manner that the largest weight value is designated to a unit with the smallest square value of the error.

In other words, the weight s is designated in proportion to the inverse number of the square of the error for each unit in the output layer.

$$(e_1, e_2, \ldots, e_{m3})$$

$$e_k = \sum_{n=1}^{N} e_k^{n2}$$

$$s=(s_1, s_2, \ldots, s_{m3})$$

$$s_k=\alpha(1/e_k) \text{ } (k=1, 2, \ldots, m3; \alpha \text{ is a positive constant})$$

Alternatively, the weight s is designated in proportion to the inverse number of the absolute value of the error for each unit in the output layer.

$$(e_1, e_2, \ldots, e_{m3})$$

$$e_k = \sum_{n=1}^{N} |e_k^n|$$

$$s=(s_1, s_2, \ldots, s_{m3})$$

$$s_k=\alpha(1/e_k) \text{ } (k=1, 2, \ldots, m3; \alpha \text{ is a positive constant})$$

Alternatively, the weight of a predetermined number of units is designated "1.0" and the weight of the other units is designated "0.0".

For example, for each units of the output layer, compare the sums of the square of the errors, and give one as the weight for the least, and give zero for the rest of the units, or, give the weight of one to a fixed number of units having less square of error, and give the rest of the units the weight of zero.

Furthermore, the absolute value of the errors may be used in place of the sum of the square of the errors.

As with the problem 3, in the case that the ranges of errors between teacher signals and output signals of individual unit in the output layer have been designated as the same value and that errors between output signals and teacher signals of the units in the output layer should be converged to predetermined ranges, the value of the square of the error of each unit in the output layer of the multilayered neural network is compared. A weight value is designated to each unit in such a manner that the largest weight value is designated to a unit with the largest square value of the error.

In other words, the weight s is designated in proportion to the value of the square of the error of each unit in the output layer.

$$(e_1, e_2, \ldots, e_{m3})$$

$$e_k = \sum_{n=1}^{N} e_k^{n2},$$

$$s=(s_1, s_2, \ldots, s_{m3})$$

$$s_k=\alpha e_k \text{ } (k=1, 2, \ldots, m3; \alpha \text{ is a positive constant})$$

Alternatively, the weight s is designated in proportion to the absolute value of the error of each unit in the output layer.

$$(e_1, e_2, \ldots, e_{m3})$$

$$e_k = \sum_{n=1}^{N} |e_k^n|$$

$$s=(s_1, s_2, \ldots, s_{m3})$$

$$s_k=\alpha e_k \text{ } (k=1, 2, \ldots, m3; \alpha \text{ is a positive constant})$$

Alternatively, the weight of a predetermined number of units is designated "1.0" and the weight of the other units is designated "0.0".

Figure 4:
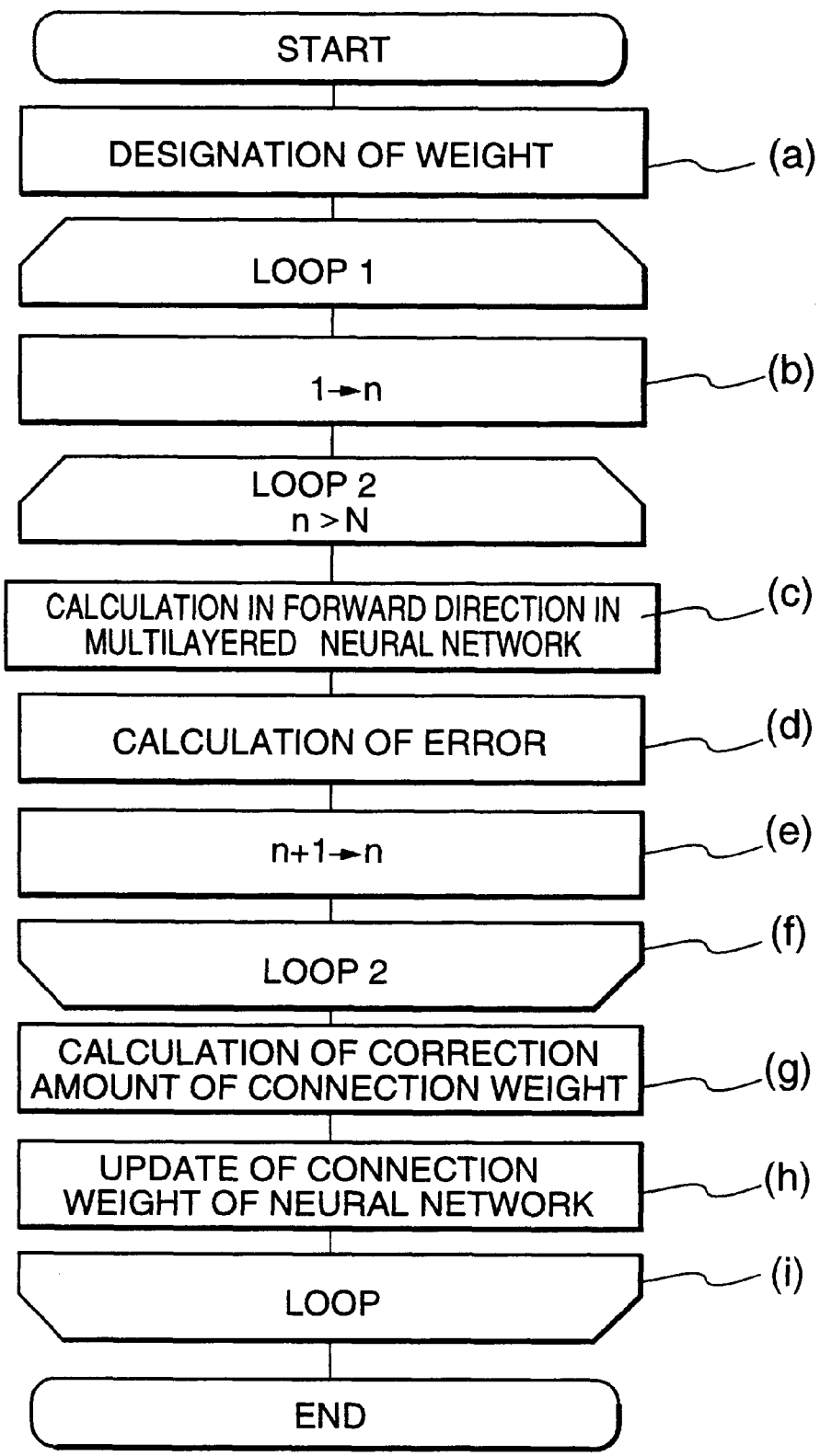
FIG. 4 is a flow chart showing a process of the controlling apparatus shown in FIG. 1.

Next, with reference to FIGS. 4 and 5, the calculating process of the controlling apparatus will be described. FIG. 4 is a flow chart showing the calculating process of the problem 1.

(a) The designating portion 3 designates the weight $s=(s_1, s_2, \ldots, s_{m3})$ corresponding to the range $\eta=(\eta_1, \eta_2, \ldots, \eta_{m3})$ of errors between teacher signals and output signals of the multilayered neural network 1.

(b) "1" is substituted into a variable n that represents a data number.

(c) The multilayered neural network 1 calculates the output signal $o^n$ in forward direction corresponding to the n-th input signal $p^n$.

(d) The subtracting device 2 subtracts the output signal $o^n$ from the teacher signal $t^n$ corresponding to the teacher signal $t^n$ and the output signal $o^n$ and supplies the error $e^n$ to the learning portion 4.

(e) "1" is added to the variable n.

(f) The steps (c) to (e) are repeated until n becomes larger than N so as to calculate the error $e^n$ for all the units.

(g) The learning portion 4 calculates the correction amounts of the connection weight value and the threshold value corresponding to the weight s, the error ($e^1, e^2, \ldots, e^N$), and the connection weight value w and the threshold value θ of the multilayered neural network 1.

(h) The connection weight value W and the threshold value θ of the multilayered neural network 1 are updated corresponding to the correction amounts of the connection weight value and the threshold value calculated at step (g).

(i) The steps (b) to (h) are repeated until the stop condition is satisfied. When the stop condition is satisfied, the multilayered neural network stops learning data.

The learning stop condition is satisfied when the value of the error function E becomes a predetermined value E0 or smaller. The definition of the error function according to the present invention is different from that of the conventional error function. In other words, in this embodiment, a weight is designated to the error function with an error coefficient. Thus, when the value of the error function becomes the predetermined value E0 or smaller, it is considered that the multilayered neural network has learnt data so that the problem is solved.

Figure 5:
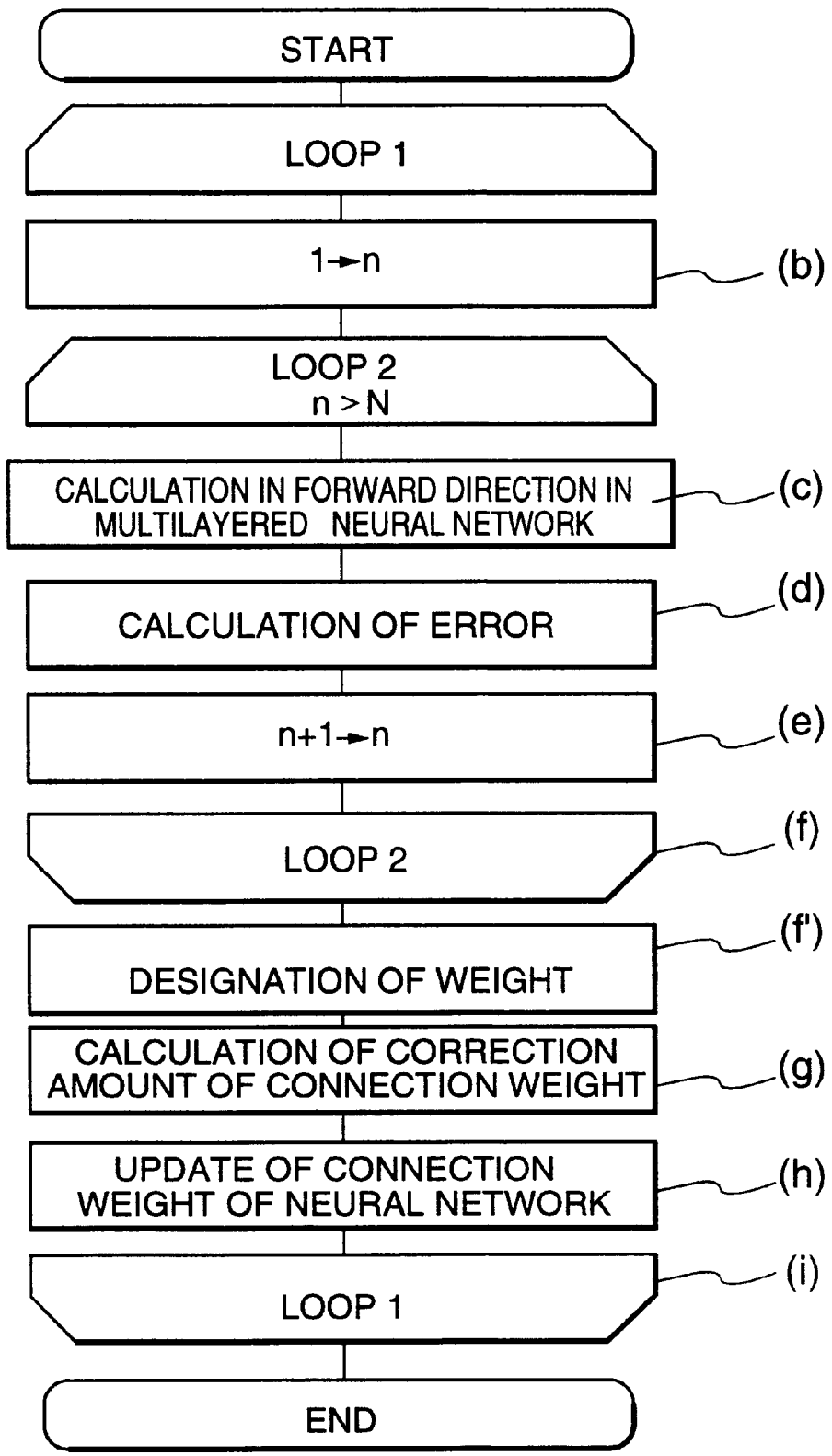
FIG. 5 is a flow chart showing a process of the controlling apparatus shown in FIG. 2.

FIG. 5 is a flow chart showing calculating processes for the problems 2 and 3. The designating portion 3 designates the weight s corresponding to the error between a teacher signal and an output signal. The weight s is designated corresponding to the error $e^n$ whenever the error $e^n$ of all data is calculated. (In FIG. 5, the step (a) shown in FIG. 4 is omitted. Instead, the step (f) is added.) Alternatively, the error function E can be defined as follows.

$$E = \frac{1}{N}\sum_{n=1}^{N} E^n,$$

$$E^n = \frac{1}{2}\sum_{k=1}^{m3} s_k (e_k^n)^2,$$

In this case, the error function $E$ is defined as follows.

$$\Delta w23_{k,j} = -\epsilon \frac{\partial E}{\partial w23_{k,j}}$$

$$= \frac{-\epsilon}{2N} s_k \sum_{n=1}^{N} \frac{\partial (e_k^n)^2}{\partial y3_k^n} \frac{d\, y3_k^n}{d\, x3_k^n} \frac{\partial x3_k^n}{\partial w23_{k,j}}$$

$$= \frac{\epsilon}{N} s_k \sum_{n=1}^{N} e_k^n y2_j^n$$

$(j = 1, 2, \ldots, m2; k = 1, 2, \ldots, m3)$ $$\Delta \theta 3_k = -\epsilon \frac{\partial E}{\partial \theta 3_k},$$

$$= \frac{-\epsilon}{2N} s_k \sum_{n=1}^{N} \frac{\partial (e_k^n)^2}{\partial y3_k^n} \frac{d\, y3_k^n}{d\, x3_k^n} \frac{\partial x3_k^n}{\partial \theta 3_k}$$

$$= \frac{-\epsilon}{N} s_k \sum_{n=1}^{N} e_k^n$$

(where $k = 1, 2, \ldots, m3$)

$$\Delta w12_{j,i} = -\epsilon \frac{\partial E}{\partial w12_{j,i}}$$

$$= \frac{-\epsilon}{2N} \sum_{n=1}^{N}\sum_{k=1}^{m3} s_k \frac{\partial (e_k^n)^2}{\partial y3_k^n} \frac{d\, y3_k^n}{d\, x3_k^n} \frac{\partial x3_k^n}{\partial y2_j^n} \frac{d\, y2_j^n}{d\, x2_j^n} \frac{\partial x2_j^n}{\partial w12_{j,i}}$$

$$= \frac{\epsilon}{N}\sum_{n=1}^{N}\sum_{k=1}^{m3} s_k e_k^n w23_{k,j} y2_j^n (1 - y2_j^n) y1_i^n$$

$(i = 1, 2, \ldots, m1; j = 1, 2, \ldots, m2)$, $$\Delta \theta 2_j = -\epsilon \frac{\partial E}{\partial \theta 2_j}$$

$$= \frac{-\epsilon}{2N}\sum_{n=1}^{N}\sum_{k=1}^{m3} s_k \frac{\partial (e_k^n)^2}{\partial y3_k^n} \frac{d\, y3_k^n}{d\, x3_k^n} \frac{\partial x3_k^n}{\partial y2_j^n} \frac{d\, y2_j^n}{d\, x2_j^n} \frac{\partial x2_j^n}{\partial \theta 2_j}$$

$$= \frac{-\epsilon}{N}\sum_{n=1}^{N}\sum_{k=1}^{m3} s_k e_k^n w23_{k,j} y2_j^n (1 - y2_j^n)$$

$(j = 1, 2, \ldots, m2)$, where $\Delta w23_{k,j}$ is the compensation amount of the connection weight value of a j-th unit in the intermediate layer and a k-th unit in the output layer; $\Delta \theta 3_k$ is the compensation amount of the threshold value of a k-th unit in the output layer; $\Delta w12_{j,i}$ is the compensation amount of the connection weight value of an i-th unit in the input layer and a j-th unit in the intermediate layer; $\Delta \theta 2_j$ is the compensation amount of the threshold value of a j-th unit in the intermediate layer; and $\epsilon$ is the learning coefficient with a small positive value.

Next, an identifying model of a moving robot according to a first embodiment of the present invention will be described.

Figure 6:
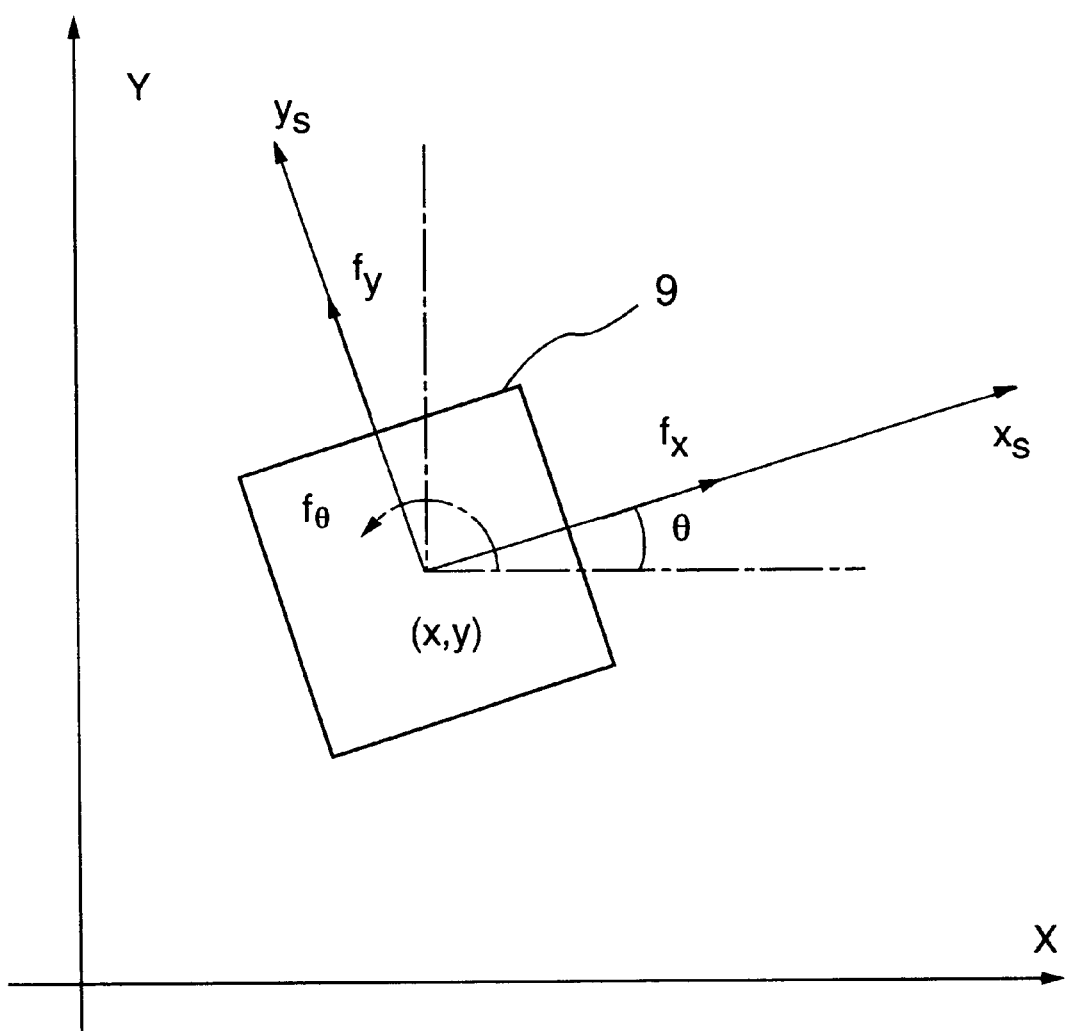
FIG. 6 is a schematic diagram showing a moving robot that moves on an XY plane for explaining a first embodiment of the present invention.

FIG. 6 is a schematic diagram showing a moving robot 9 that moves on an XY plane. Force $f_x$ in direction $X_s$ of a fixed coordinate system on the moving robot 9, force $f_y$ in direction $Y_s$ thereof, and rotation torque $f\theta$ are supplied as operation amounts to the moving robot 9. The position (x, y) of the moving robot 9, the direction $\theta$, and the velocity components (dx, dy) and $d\theta$ are observed as control amounts. The multilayered neural network according to the present invention is applied for the identifying model of the moving robot 9.

Figure 7:
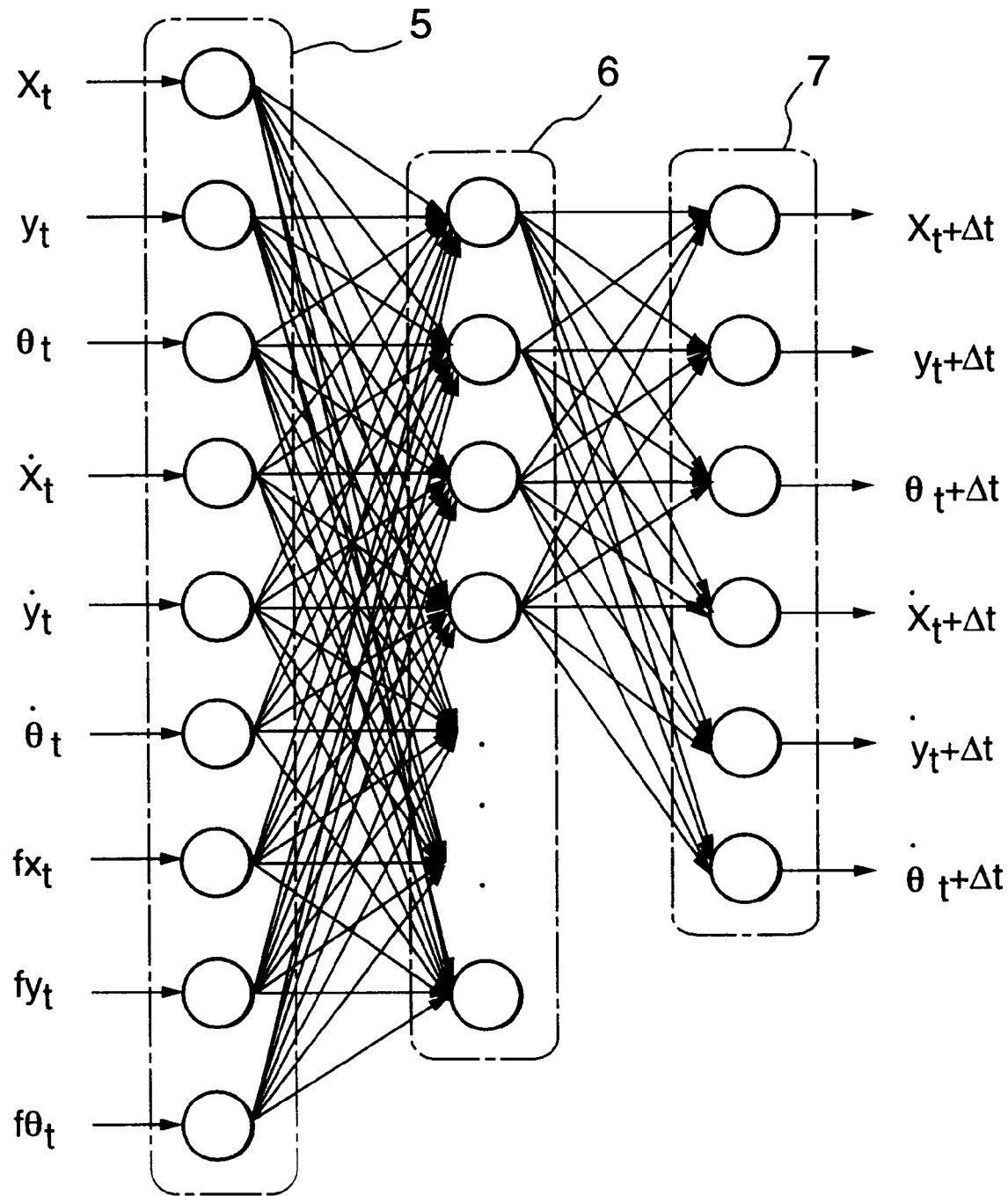
FIG. 7 is a schematic diagram showing a structure of a multilayered neural network that operates as an identifying model of the moving robot shown in FIG. 6.
Figure 8A:
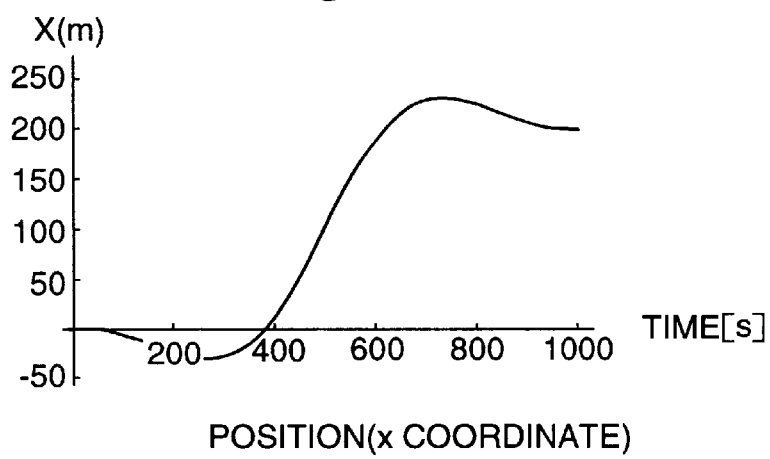
FIG. 8A, FIG. 8B, FIG. 8C, FIG. 8D, FIG. 8E, FIG. 8F, FIG. 8G, FIG. 8H, and FIG. 8I show computer simulation results in the case that the motion of a robot is controlled with the multilayered neural network that has learnt data according to the first embodiment of the present invention.
Figure 8B:
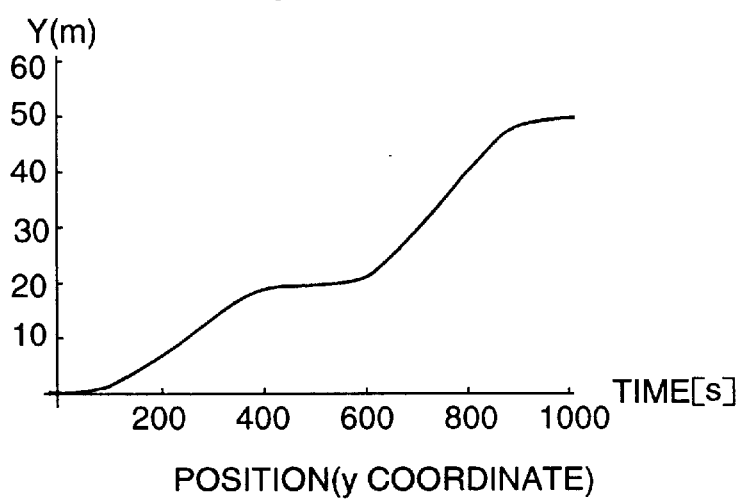
Figure 8C:
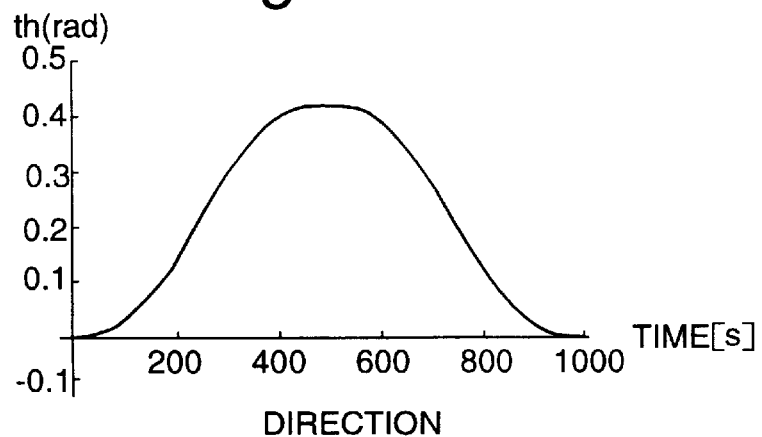
Figure 8D:
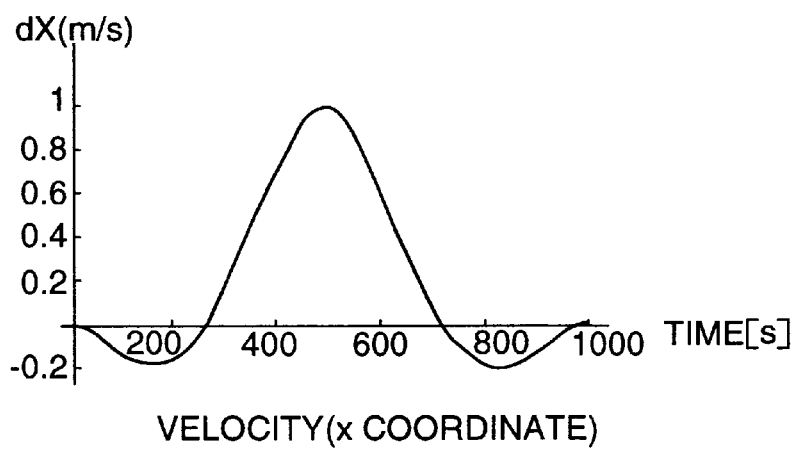
Figure 8E:
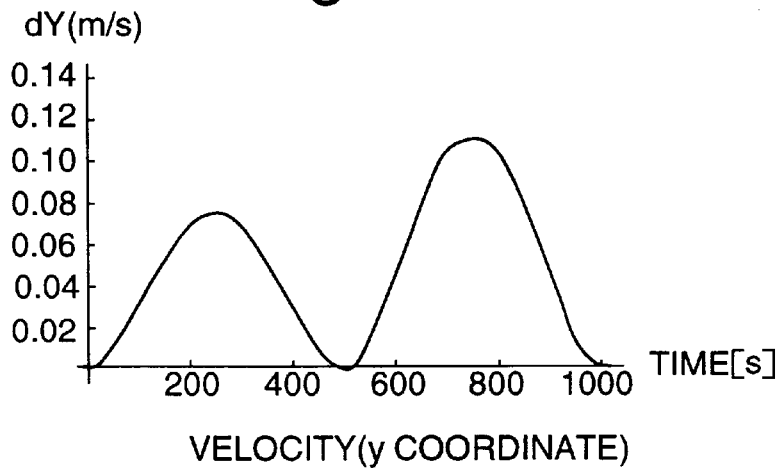
Figure 8F:
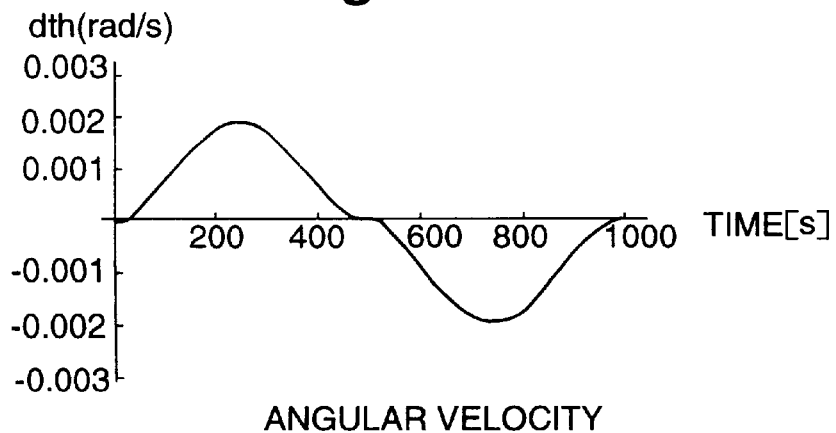
Figure 8G:
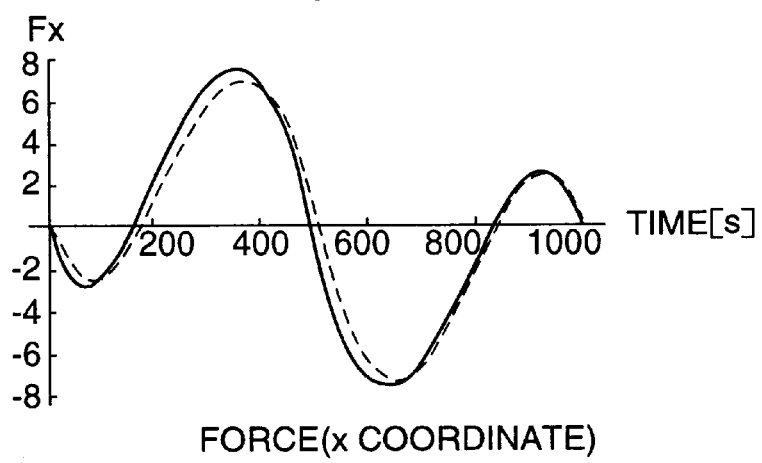
Figure 8H:
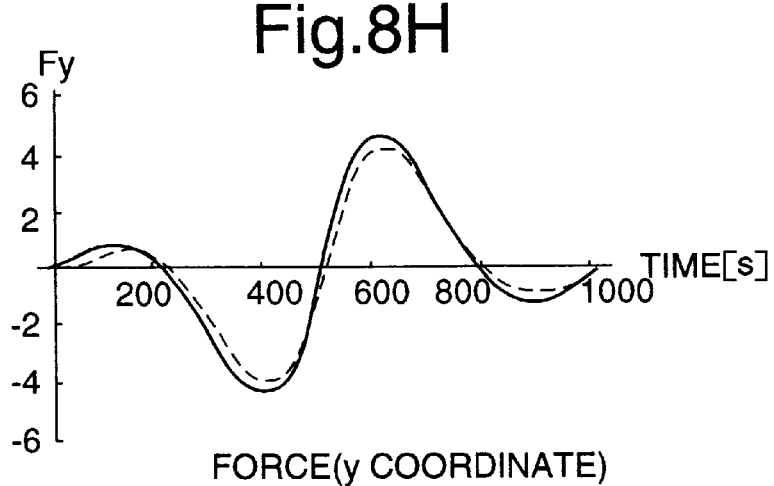
Figure 8I:
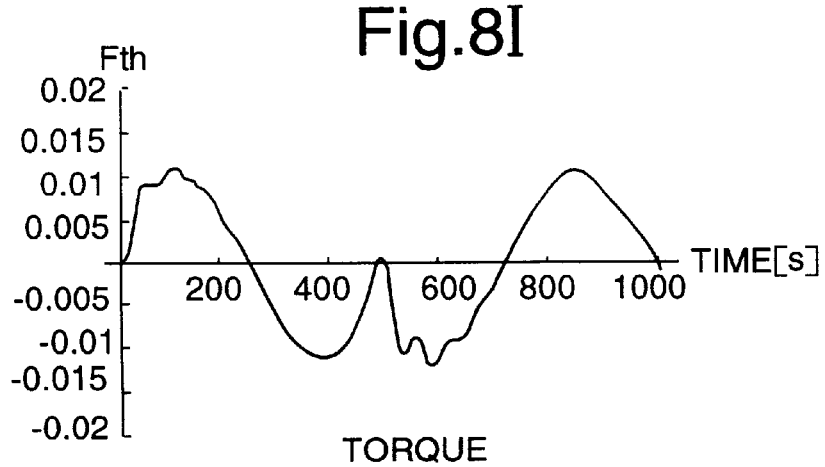
Figure 9A:
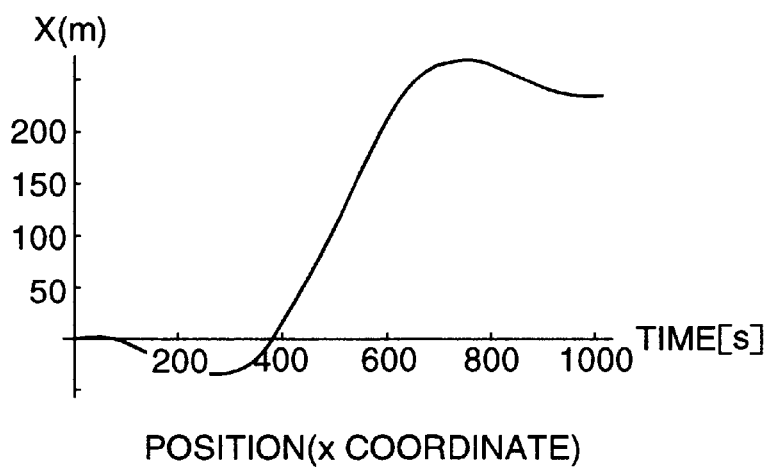
FIG. 9A, FIG. 9B, FIG. 9C, FIG. 9D, FIG. 9E, FIG. 9F, FIG. 9G, FIG. 9H, and FIG. 9I show computer simulation results in the case that the motion of a robot is controlled with the multilayered neural network that has learnt data according to the conventional error back propagation method.
Figure 9B:
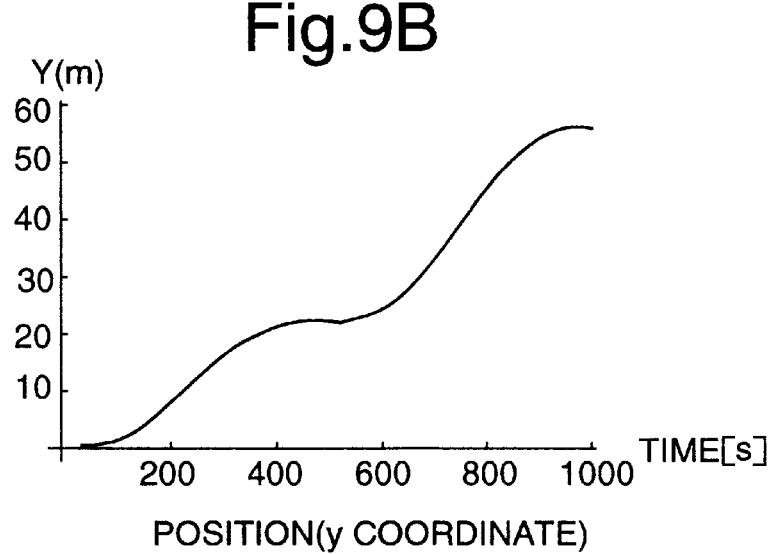
Figure 9C:
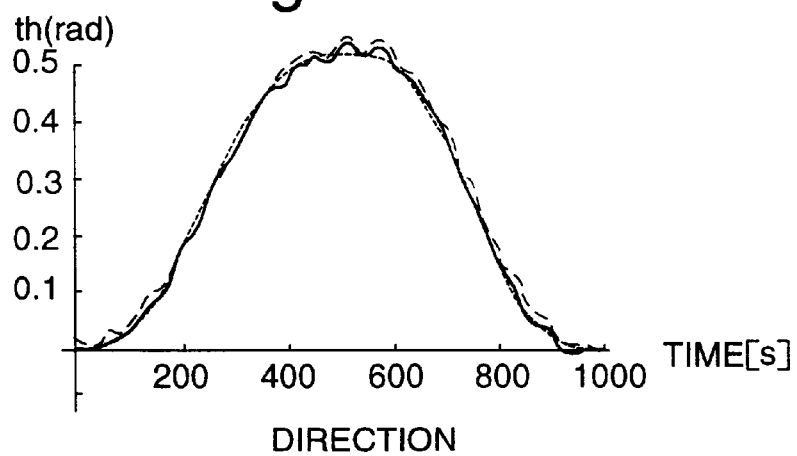
Figure 9D:
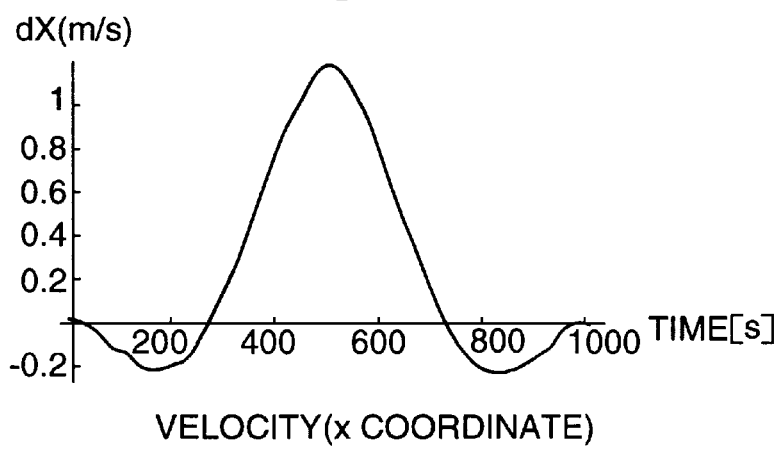
Figure 9E:
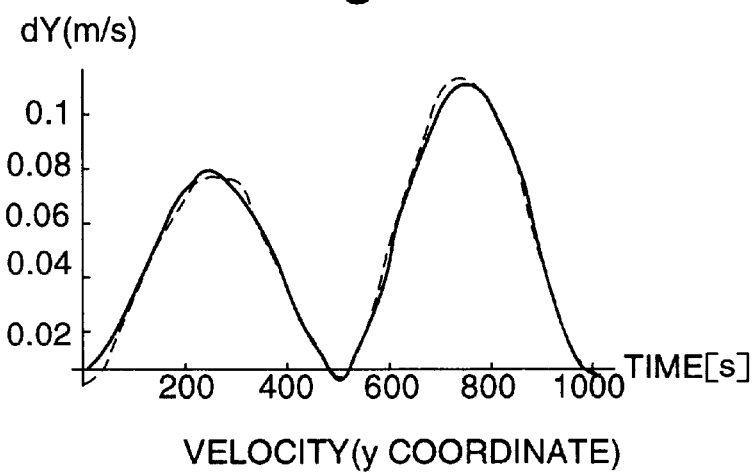
Figure 9F:
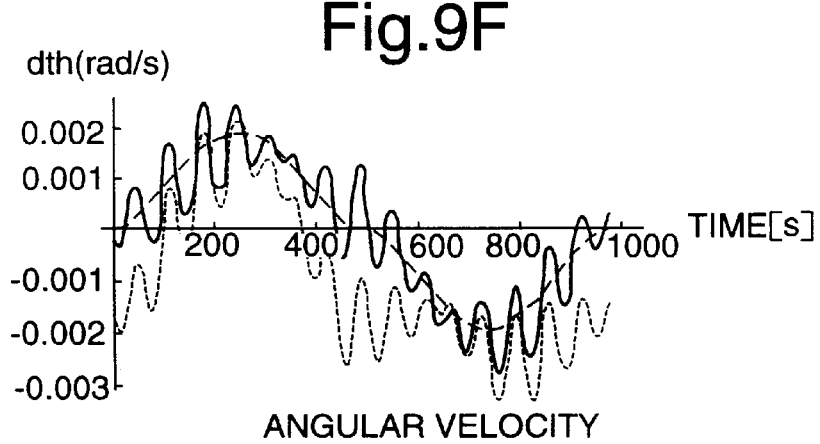
Figure 9G:
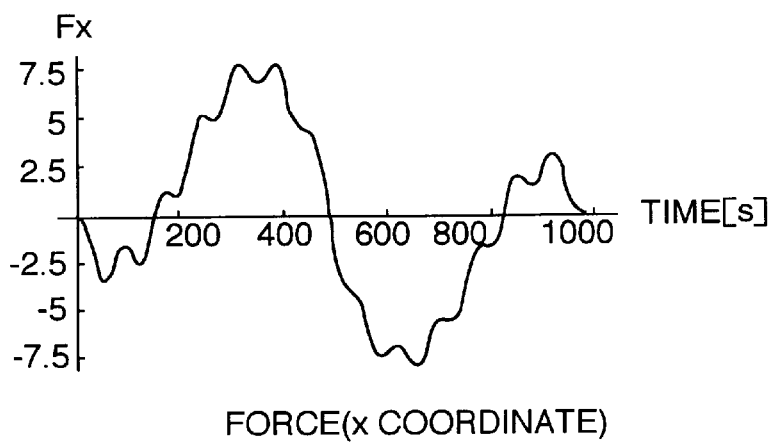
Figure 9H:
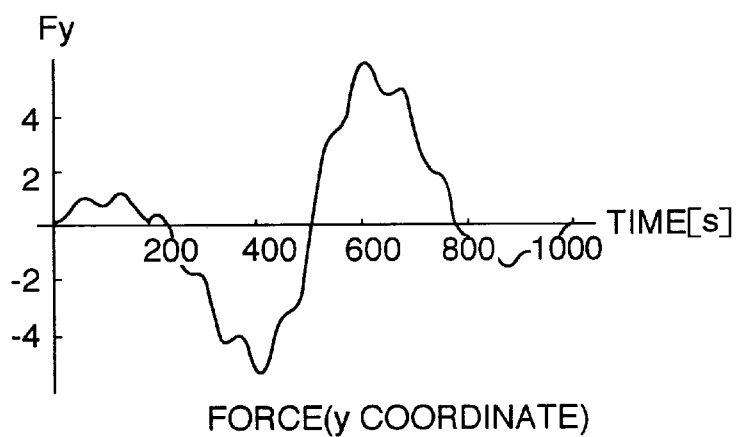
Figure 9I:
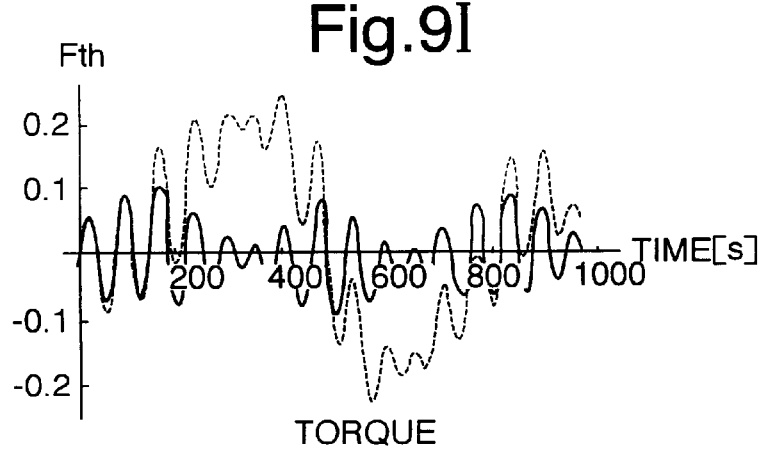

FIG. 7 is a schematic diagram showing a structure of the multilayered neural network that operates as the identifying model of the moving robot 9. When control amounts and operation amounts at time t are input, control amounts at time t+Δt are output.

The control amounts that are output signals of the multilayered neural network include numeric values of different units such as position, direction, velocity, and angular velocity. The ranges of the errors between teacher signals and output signals largely vary depending on the types of output signals. In the conventional method, when the errors of control amounts have small ranges, they cannot be satisfactorily learnt. Alternatively, the errors of control amounts with large ranges are excessively learnt.

It is assumed that the ranges of errors between teacher signals and output signals designated for individual units in the output layer are denoted as follows.

$\eta = (\eta_x, \eta_y, \eta_\theta, \eta_{\dot{x}}, \eta_{\dot{y}}, \eta_{\dot{\theta}})$ The designating portion 3 designates the weight s as the inverse number of the range of each error.

$$s = \left(\frac{1}{\eta_x}, \frac{1}{\eta_y}, \frac{1}{\eta_\theta}, \frac{1}{\eta_{\dot{x}}}, \frac{1}{\eta_{\dot{y}}}, \frac{1}{\eta_{\dot{\theta}}}\right)$$

Thus, the identifying model of the moving robot can be learnt corresponding to the ranges of the errors between teacher signals and output signals.

FIG. 8A, FIG. 8B, FIG. 8C, FIG. 8D, FIG. 8E, FIG. 8F, FIG. 8G, FIG. 8H, and FIG. 8I show computer simulation results of a controlling system having the multilayered neural network. In the simulation, corresponding to the method of the present invention, the ranges of the errors between teacher signals and output signals of the multilayered neural network were designated as η=(4.11, 1.11, 0.0407, 0.216, 0.214, 0.0013) (the weights of the output signals thereof were designated as s=(0.243, 0.901, 24.6, 4.63, 4.67, 769.2)) and the simulation was performed 3000 times. FIG. 9A, FIG. 9B, FIG. 9C, FIG. 9D, FIG. 9E, FIG. 9F, FIG. 9G, FIG. 9H, and FIG. 9I show computer simulation results of a multilayered neural network corresponding to the conventional error back propagation method of which the simulation was performed 3000 times. FIG. 8A through FIG. 8F and FIG. 9A through FIG. 9F show control amounts, whereas FIG. 8G through FIG. 8I and FIG. 9G through FIG. 9I show operation amounts. The horizontal axis of each graph represents a time axis (ranging from 0 to 1,000 sec). Dotted lines, solid lines, and dashed lines of control amounts represent target paths, real paths, and predicted paths of the multilayered neural network, respectively. Dotted lines of the operation amounts represent operation amounts calculated by the feedback controlling system (these operation amounts are referred to as feedback operation amounts). Solid lines of the operation amounts represent operation amounts of which the controlling system having the multilayered neural network corrected the feedback operation amounts. With these operation amounts, the moving robot 9 is controlled.

As the computer simulation results of which the moving robot was controlled with the multilayered neural network that has learnt data corresponding to the conventional error back propagation method, the direction and angular velocity were controlled with fluctuations. In contrast, as the computer simulation results of which the moving robot was controlled with the multilayered neural network that has learnt data corresponding to the method of the present invention, the direction and angular velocity of the moving robot were smoothly controlled without fluctuations. The simulation results show that since weights were designated as values proportional to the inverse numbers of the ranges of the errors between teacher signals and output signals. Thus, with respect to the direction and angular velocity of which the ranges of the errors thereof are small, the errors between teacher signals and output signals are largely evaluated in error functions. Thus, since the control amounts of the direction and angular velocity were quickly learnt, the direction and angular velocity were accurately output in comparison with the conventional error back propagation method.

Next, a dissolved oxygen concentration predicting model in an aeration tank of a sewerage process according to a second embodiment of the present invention will be described.

Figure 10:
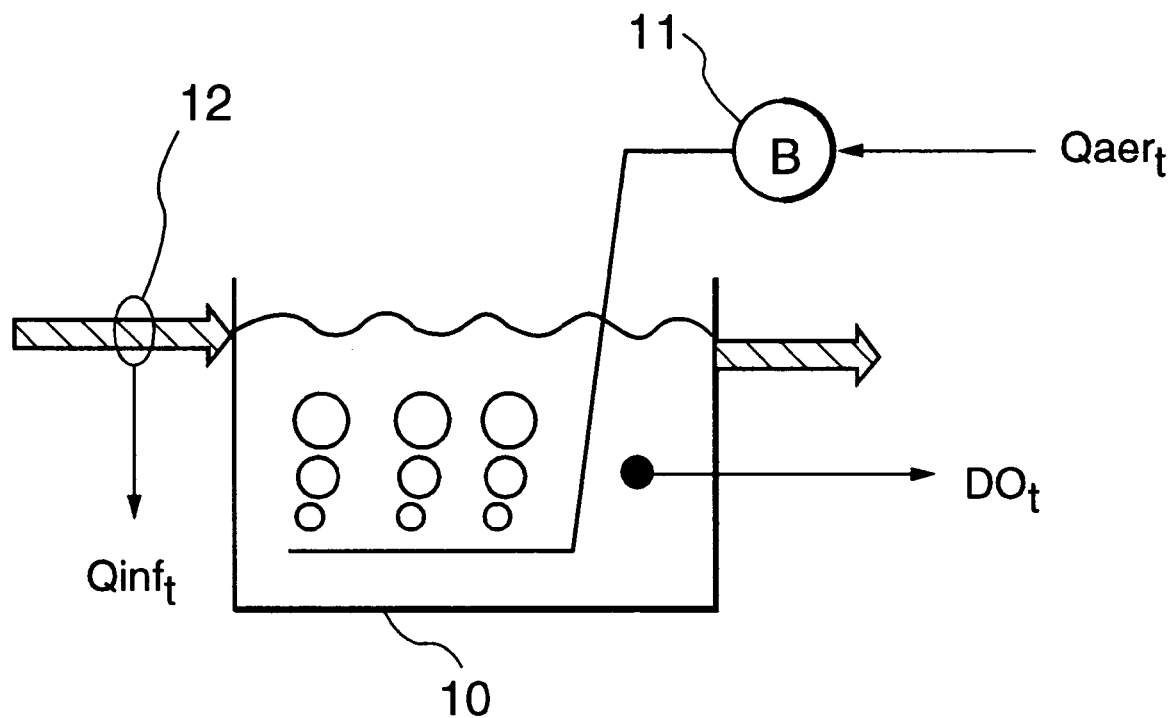
FIG. 10 is a schematic diagram showing an aeration tank in a sewerage process according to a second embodiment of the present invention.
Figure 11:
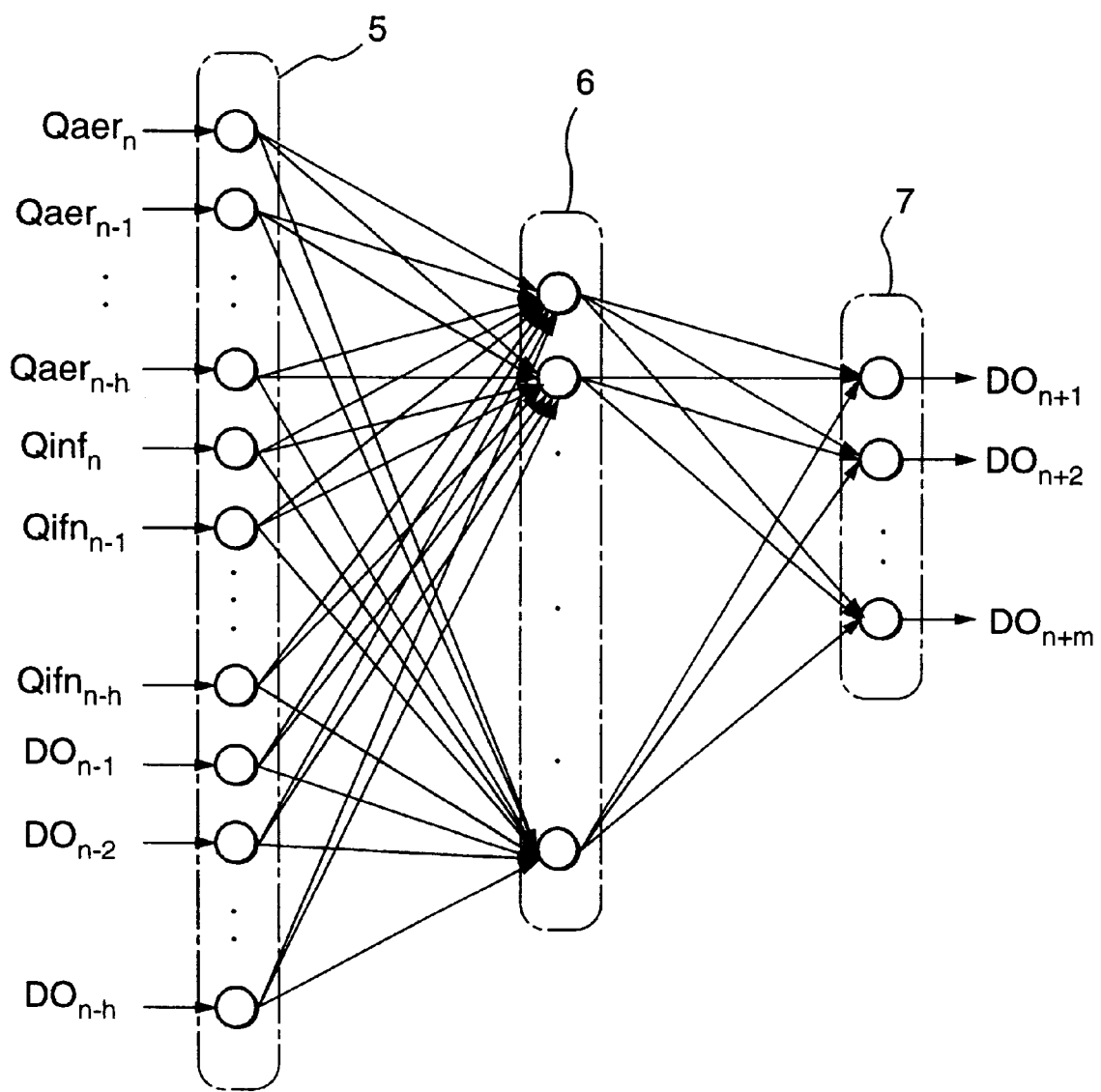
FIG. 11 is a schematic diagram showing a structure of a dissolved oxygen concentration predicting model having a multilayered neural network.

FIG. 10 is a schematic diagram showing an aeration tank. In the aeration tank 10, air is supplied to a sewerage by a blower 11. Thus, sludge in the sewerage is agitated and microorganisms in the sludge are activated. Thus, the microorganisms adsorb and absorb inorganic substances and organic substances. To activate the microorganisms in the sludge, the concentration of the dissolved oxygen in the sewerage is kept constant. In this embodiment, the dissolved oxygen concentration predicting model that controls the dissolved oxygen concentration is structured with a multilayered neural network. The multilayered neural network learns data so that the dissolved oxygen concentration in the aeration tank obtain a specialty.

Since the dissolved oxygen concentration is largely affected by an aeration air rate Qaer to the aeration tank 10 and a sewerage flow rate Qinf, a model is structured in such a manner that past and present aeration air rates ($Qaer_n$, $Qaer_{n-1}$, ..., $Qaer_{n-h}$), past and present sewerage flow rates ($Qinf_n$, $Qinf_{n-1}$, ..., $Qinf_{n-h}$), and past and present dissolved oxygen concentrations ($DO_n$, $DO_{n-1}$, ..., $DO_{n-h}$) (where h is a positive integer) are input signals and future dissolved oxygen concentration is an output signal.

However, the dynamic characteristics of the sewerage process are unknown. In addition, it is unclear whether or not a future dissolved oxygen concentration can be accurately predicted with the past and present aeration air rates, sewerage flow rates, and dissolved oxygen concentrations. Thus, a multilayered neural network that can predict future dissolved oxygen concentrations ($DO_{n+1}$, $DO_{n+2}$, ..., $D_{On+m}$) (where m is a positive integer) at a plurality of future points is structured. When a dissolved oxygen concentration at one future point can be accurately output, the multilayered neural network is controlled so that the predicted dissolved oxygen concentration is converged to a target value.

In other words, when one of a plurality of units outputs an accurate signal, the other units do not need to output accurate signals. For such a problem, in this embodiment, the square of the error between a teacher signal and an output signal for each unit is compared. A weight value is designated to each unit in such a manner that the largest weight value is designated to a unit with the smallest square value of the error. In such a manner, the learning process is quickly performed for units with small values of the squares of errors. Thus, with a small number of times of the learning process, one or part of units output accurate signals.

Next, a multilayered neural network for recognizing characters according to a third embodiment of the present invention will be described.

Figure 12:
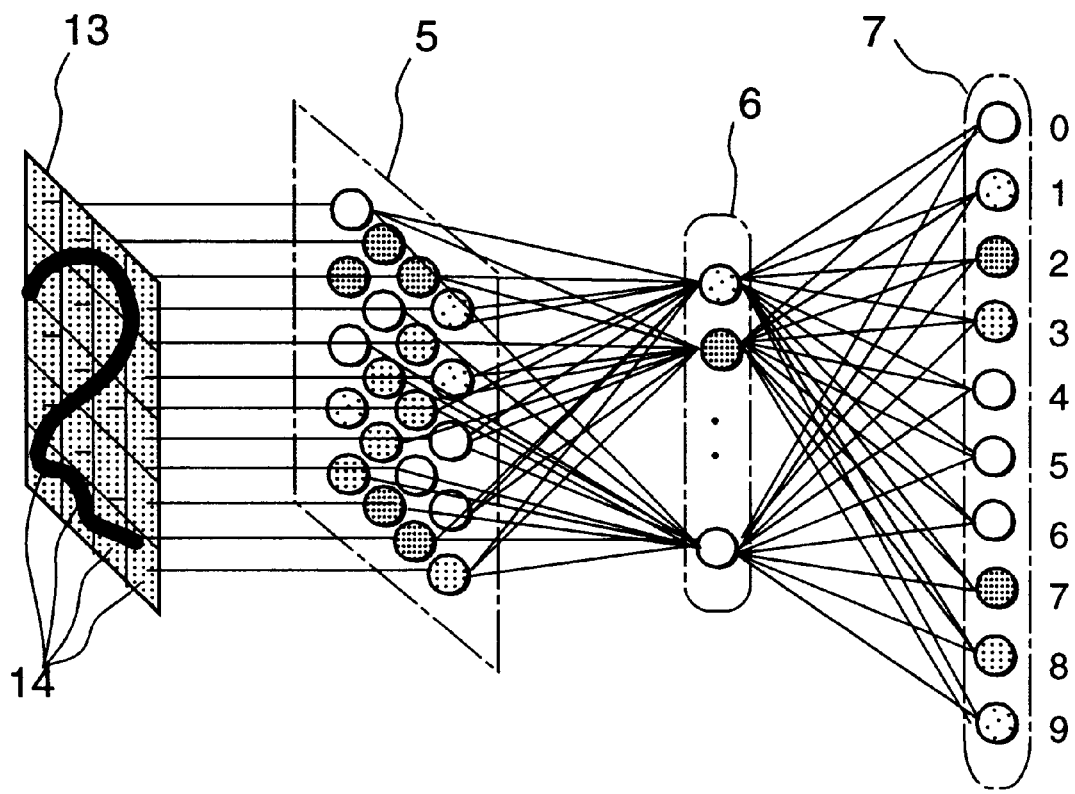
FIG. 12 is a schematic diagram showing a structure of a multilayered neural network for recognizing characters according to a third embodiment of the present invention.

FIG. 12 is a schematic diagram showing a multilayered neural network for recognizing characters. Units in an input layer 5 of the multilayered neural network accord with meshes 14 of a character input portion 13 in one by one relation. The area ratio of fill portion of a character as an object and the meshes 14 is input to units in the input layer. For example, when all the meshes are filled, 1.0 is input. In contrast, when all the meshes are not filled, 0.0 is input.

An output layer is composed of for example 10 units that correspond to numeric characters "0" to "9". When "0" is written to the character input portion 13, the unit corresponding to the numeric character "0" outputs 1, whereas the other units in the output layer output 0. However, when a character is recognized, corresponding to the input character, a character corresponding to a unit with the maximum output value is recognized.

Thus, when one of units in the output layer does not learn data and thereby outputs a value larger than 1, even if any character is input, a character corresponding to the unit is selected. Consequently, even if the other units in the output layer accurately learn data, regardless of whether a unit outputs 1 corresponding to the input character, they cannot accurately recognize characters.

Thus, in such a case, all units in the output layer should properly learn data. In this embodiment, the square of the error between the teacher signal and the output signal for each unit is compared. A weight value is designated to each unit in such a manner that the largest weight value is designated to a unit with the largest square value of the error. Thus, a unit with a larger value of the square of the error more quickly learns data than other units. Consequently, the errors of units in the output layer can be converged to predetermined ranges. Thus, all the units in the output layer can equally learn data.

Next, a manipulator for generating a path according to the fourth embodiment of the present invention will be described.

Figure 13:
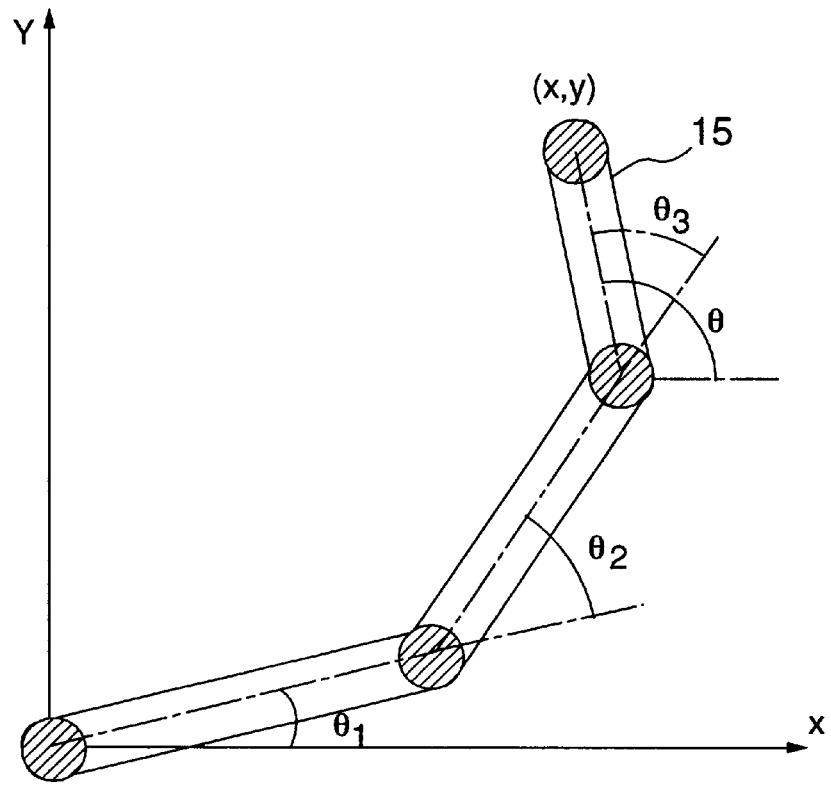
FIG. 13 is a schematic diagram showing a three-articulated manipulator according to a fourth embodiment of the present invention.

FIG. 13 is a schematic diagram showing a three-articulated manipulator 15 that operates on an XY plane. Now, consider a problem for generating a path from a tip position $(x_0, y_0)$ and a direction $\theta_0$ of the manipulator 15 at time 0 to target tip position $(x^d, y^d)$ and a target direction $\theta^d$ at time $N\Delta t$.

When articulate angles $(\theta^1, \theta^2, \theta^3)$ are input to the manipulator 15, it is operated so that the input angles are maintained. Thus, the coordinates $(x, y)$ of the tip of the manipulator 15 and the direction $\theta$ of the tip are measured. Since the input signal that is directly supplied to the manipulator 15 is the articulate angles $(\theta_1, \theta_2, \theta_3)$, the path of articulate angles to the target tip position $(x^d, y^d)$ and the target direction $\theta^d$ should be generated.

Figure 14:
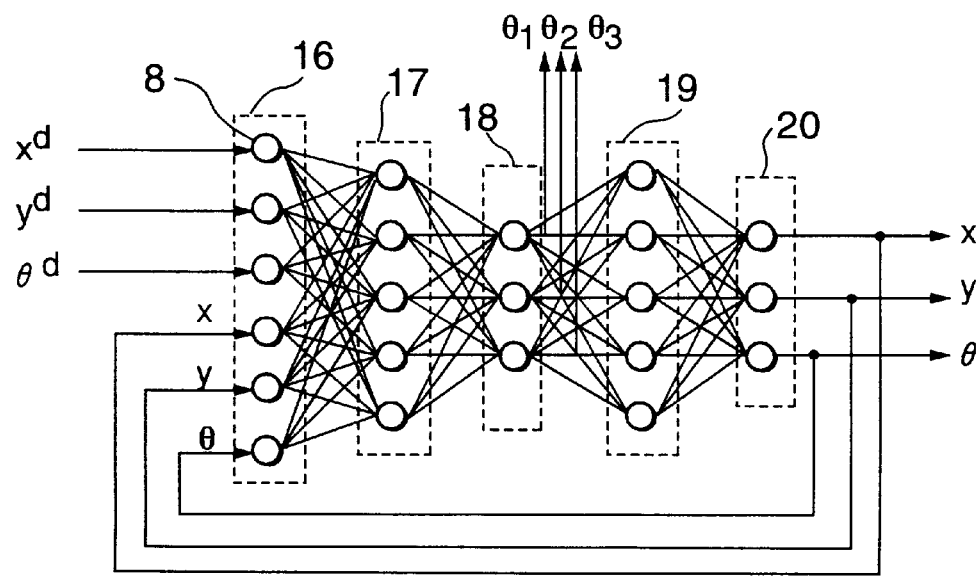
FIG. 14 is a schematic diagram showing a structure of a multilayered neural network for controlling the three-articulated manipulator according to a fourth embodiment of the present invention.

FIG. 14 is a schematic diagram showing a structure of a neural network that operates as a path generating model of the manipulator 15. Referring to FIG. 14, the neural network is composed of five layers. Layers 16 to 18 serve to generate a path. Layers 18 to 20 serve to learn a kinematics model. In the layers 16 to 18, when a target tip position $(x^d, y^d)$, a target direction $\theta^d$, a tip position $(x_n, y_n)$ at time $n\Delta t$, and a direction $\theta_n$ at time $n\Delta t$ are input, articulate angles $(\theta_{1,n+1}, \theta_{2,n+1}, \theta_{3,n+1})$ at time $(n+1)\Delta t$ are calculated. In the layers 18 to 20, a tip position $(x_{n+1}, y_{n+1})$ and a direction $\theta_{n+1}$ are calculated corresponding to the calculated articulate angles $(\theta_{1,n+1}, \theta_{2,n+1}, \theta_{3,n+1})$. In the neural network, when the target tip position $(x^d, y^d)$, the direction $\theta^d$, the tip position $(x_0, y_0)$ at time 0, and the direction $\theta_0$ at time 0 are input to the layer 16, articulate angles $(\theta_{1,1}, \theta_{2,1}, \theta_{3,1})$ at time $\Delta t$ are output from the layer 18. A tip position $(x_1, y_1)$ at time $\Delta t$ and a direction $\theta_1$ at time $\Delta t$ are output from the layer 20. The calculated tip position $(x_1, y_1)$ and the direction $\theta_1$ are fed back to the layer 16 by a loop connection so that they are used to calculate articulate angles at next time. In such a manner, calculations are repeated from time 0 to final time $N\Delta t$. Thus, articulate angles at individual times are generated.

The kinematics model has been learnt in the layers 18 to 20. Proper articulate angles $(\theta_{1,k}, \theta_{2,k}, \theta_{3,k})$ are input to the manipulator. A tip position $(x_k o, y_k o)$ and a direction $\theta_k o$ at the point are measured. The articulate angles $(\theta_{1,k}, \theta_{2,k}, \theta_{3,k})$ are learnt as an input signal. The measured tip position $(x_k o, y_k o)$ and direction $\theta_k o$ are learnt as a teacher signal.

With the learnt kinematics model, the path of the manipulator 15 is generated. The target tip position $(x^d, y^d)$, the target direction $\theta^d$, the tip position $(x_0, y_0)$ at time 0, and the direction $\theta_0$ at time 0 are input to the layer 16. Thus, articular angles at time $N\Delta t$, a tip position at time $N\Delta t$, and a direction at time $N\Delta t$ are calculated.

An error function is defined with an error between a tip position $(x_N, y_N)$ and a direction $\theta_N$ at final time $N\Delta t$ and a target tip position $(x_d, y_d)$ and a target direction $\theta^d$.

Although the connection weight values in the layers 16 to 18 are corrected by the error back propagation method (the connection weight values in the layers 18 to 20 have been learnt), errors are back propagated in the feed back loop. The connection weight values in the layers 16 to 18 are corrected so that time is traced back to time 0. As described above, the method for learning the recurrent network in the reverse time direction is referred to as back propagation through time method.

A path from time 0 to final time $N\Delta$ is generated and then learnt in the reverse time direction. When the tip position $(x_N, y_N)$ at final time $N\Delta t$ and the direction $\theta_N$ accord with the target tip position $(x^d, y^d)$ and the target direction $\theta^d$, it is considered that an accurate path has been generated (an articulate angle at each time is obtained from the layer 18).

In learning the kinematics model in the layers 18 to 20, when articulate angles $(\theta_{1,k}, \theta_{2,k}, \theta_{3,k})$ (where $k=1, 2, \ldots, M$) are input to the layer 18, assuming that a tip position and a direction that are output from the layer 20 are $(x_k, y_k)$ and $\theta_k$ and that the measured tip position $(x_k o, y_k o)$ and the direction $\theta_k o$ are teacher signals, the error function E in the conventional method is defined as follows.

$$E = \frac{1}{2} \sum_{k=1}^{M} [(x_k - x_k^o)^2 + (y_k - y_k^o)^2 + (\theta_k - \theta_k^o)^2]$$

However, the range of the error between teacher signal and output signal of the tip position is largely different from the range of the error between teacher signal and output signal of the direction. Depending on a problem, in the manipulator 15, the range of the error between teacher signal and output signal in the x direction of the tip position may be different from the range of the error between teacher signal and output signal in the y direction thereof. Thus, errors with small ranges may be not satisfactorily learnt. Alternatively, errors with large ranges may be excessively learnt. This applies to the correcting process of the connection weight values in the layers 16 to 18. In the conventional method, the error function E is defined as follows.

$$E = \frac{1}{2} \left\{ (x_N - x^d)^2 + (y_N - y^d)^2 + (\theta_N - \theta^d)^2 \right\}$$

However, since the ranges of output signals largely differ from each other, errors with small ranges may be not satisfactorily converged to target values. Alternatively, errors with large ranges may be excessively calculated.

Assuming that the ranges of errors between teacher signals and output signals of the tip position and the direction of the manipulator 15 are denoted by $$\eta = (\eta_x, \eta_y, \eta_\theta),$$

In this embodiment, the weight s is designated to a value proportional to the inverse number of the range of each error for the tip position and the direction of the manipulator 15.

$$s = (s_1, s_2, s_3) = \alpha(1/\eta_x, 1/\eta_y, 1/\eta_{74})$$

In learning a kinematic model in the layers 18 to 20, the error function E is defined as follows.

$$E = \frac{1}{2} \sum_{k=1}^{M} \frac{s_1(x_k - x_k^o)^2 + s_2(y_k - y_k^o)^2 + s_3(\theta_k - \theta_k^o)^2}{s_1 + s_2 + s_3}$$

In correcting connection weight values for generating a path in the layers 16 to 18, the error function E is defined as follows.

$$E = \frac{1}{2} \frac{s_1(x_N - x^d)^2 + s_2(y_N - y^d)^2 + s_3(\theta_N - \theta^d)^2}{s_1 + s_2 + s_3}$$

Thus, since errors between teacher signals and output signals of units with small ranges are designated large weight values by the error function, they more quickly learn data than other units. Consequently, they learn corresponding to the ranges of the errors.

As described above, according to the controlling apparatus of the present invention, since the error function of which the square of the error between a teacher signal and a real output signal is designated a weight corresponding to a problem, situation, and so forth is evaluated, the multilayered neural network can be adaptively controlled.

For a problem of which ranges of errors between teacher signals and output signals have been designated and errors of units in the output layer should be converged to predetermined ranges, since the square errors are designated weights corresponding to ranges of the errors between teacher signals and output signals (for example, values proportional to inverse numbers of ranges of errors between teacher signals and output signals are designated as weight values), with respect to units with small ranges of errors, the error function is largely evaluated. Thus, the units learn data so that the errors thereof are converged to predetermined ranges.

For a problem of which as long as an error between teacher signals and output signals of one unit is converged to a predetermined range, error between teacher signals and output signals of other units can be deviated from predetermined ranges, a weight value is designated to each unit in such a manner that the largest weight value is designated to a unit with the smallest square value of the error between teacher signal and output signal (namely, a value proportional to the inverse number of the square of the error is designated as a weight value or a value proportional to the inverse number of the absolute value of the error is designated a weight value). Thus, units with small square values of errors more quickly learn data than the other units. Thus, with a small number of times of the learning process, a problem can be solved.

In addition, for a problem of which ranges of errors between teacher signals and output signals of units in the output layer have been designated as the same value and errors between teacher signals and output signals of the units in the output layer should be converged to the predetermined range, a weight value is designated to each unit in such a manner that the largest weight value is designated to a unit with the largest square value of the error between teacher signal and output signal (namely, a value proportional to the square of the error is designated as a weight value or a value proportional to the absolute value of the error is designated a weight value). The units with large square values of errors quickly learn data than the other units. Thus, all the units in the output layer can equally learn data. Consequently, the units can learn data with a small number of times of the leaning process without a loss.

In addition, according to the controlling method of the present invention, since an error function designating a weight value corresponding to a problem, a situation, and the like to a square of an error between a teacher signal and a real output signal is evaluated, the multilayered neural network can be adaptively controlled.

Moreover, since the medium according to the present invention has a program for evaluating an error function for designating a weight value to a square value of an error between a teacher signal and a real output signal, a method for executing an adaptive controlling process can be provided.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A controlling apparatus comprising:
    a multilayered neural network designating a range of a permissible error between a teacher signal and an output signal;
    means for calculating the error between the teacher signal and the output signal received from said multilayered neural network;
    weight designating means for designating a weight corresponding to the range; and
    means for defining a function reflecting the value of the error and the value of the designated weight and for prosecuting the learning process of the multilayered neural network so that the value of the function becomes minimum,
    wherein the function is defined as follows:

$$E = \frac{1}{2} \frac{\sum_{k=1}^{m} s_k (t_k - o_k)^2}{\sum_{l=1}^{m} s_l}$$

where $t_k$ is a teacher signal; $o_k$ is an output signal; $s_k$ and $s_1$ are weights; k and l are variable natural numbers that are 1 or larger and m is a dimensional number of the output signal.

2. A controlling apparatus, comprising:
    a multilayered neural network designating range of a permissible error between a teacher signal and an output signal;
    means for calculating the error between the teacher signal and the output signal received from said multilayered neural network;
    weight designating means for designating a weight corresponding to the range; and
    means for defining a function reflecting the value of the error and the value of the designated weight and for prosecuting the learning process of the multilayered neural network so that the value of the function becomes minimum,
    wherein said weight designating means designates a value proportional to the inverse number of the designated range as a weight.

3. A controlling apparatus, comprising:
    a multilayered neural network;
    means for calculating an error between a teacher signal and an output signal received from said multilayered neural network;
    means for designating a weight corresponding to the error; and
    means for defining a function reflecting the value of the error and the value of the designated weight and for prosecuting the learning process of the multilayered neural network so that the value of the function becomes minimum,
    wherein said weight designating means designates a value proportional to the inverse number of a square value of the calculated error as a weight.

4. A controlling apparatus, comprising:
    a multilayered neural network;

means for calculating an error between a teacher signal and an output signal received from said multilayered neural network;

means for designating a weight corresponding to the error; and means for defining a function reflecting the value of the error and the value of the designated weight and for prosecuting the learning process of the multilayered neural network so that the value of the function becomes minimum, wherein said weight designating means designates a value proportional to the inverse number of the absolute value of the calculated error as a weight.

5. A controlling apparatus, comprising:

a multilayered neural network;

means for calculating an error between a teacher signal and an output signal received from said multilayered neural network;

means for designating a weight corresponding to the error; and means for defining a function reflecting the value of the error and the value of the designated weight and for prosecuting the learning process of the multilayered neural network so that the value of the function becomes minimum, wherein said weight designating means designates a value proportional to a square value of the calculated error as a weight.

6. A controlling apparatus, comprising:

a multilayered neural network;

means for calculating an error between a teacher signal and an output signal received from said multilayered neural network;

means for designating a weight corresponding to the error; and means for defining a function reflecting the value of the error and the value of the designated weight and for prosecuting the learning process of the multilayered neural network so that the value of the function becomes minimum, wherein said weight designating means designates a value proportional to the absolute value of the calculated error as a weight.

7. A controlling method, comprising the steps of:

designating a range of a permissible error between a teacher signal and an output signal received from a multilayered neural network;

calculating an error between the teacher signal and the output signal;

designating a weight corresponding to the designated range;

defining a function reflecting the value of the calculated error and the value of the designated weight; and prosecuting the learning process of the multilayered neural network so that the value of the defined function becomes minimum, wherein the function is defined as follows:

$$E = \frac{1}{2}\frac{\sum_{k=1}^{m} s_k(t_k - o_k)^2}{\sum_{l=1}^{m} s_l}$$

where $t_k$ is a teacher signal; $o_k$ is an output signal; $s_k$ and $s_1$ are weights; k and l are variable natural numbers that are 1 or larger and m is a dimensional number of the output signal.

8. A controlling method, comprising the steps of:

designating a range of a permissible error between a teacher signal and an output signal received from a multilayered neural network;

calculating an error between the teacher signal and the output signal;

designating a weight corresponding to the designated range;

defining a function reflecting the value of the calculated error and the value of the designated weight; and prosecuting the learning process of the multilayered neural network so that the value of the defined function becomes minimum, wherein the weight is designated as a value proportional to the inverse number of the designated range.

9. A controlling method of controlling a mutilayered neural network, comprising the steps of:

calculating an error between a teacher signal and an output signal;

designating a weight corresponding to the calculated error;

defining a function reflecting the value of the calculated error and the value of the designated weight; and prosecuting the learning process of the multilayered neural network so that the value of the defined function becomes minimum, wherein the weight is designated as a value proportional to the inverse number of a square value or the calculated error.

10. A controlling method of controlling a multilayered neural network, comprising the steps of:

calculating an error between a teacher signal and an output signal;

designating a weight corresponding to the calculated error;

defining a function reflecting the value of the calculated error and the value of the designated weight; and prosecuting the learning process of the multilayered neural network so that the value of the defined function becomes minimum, wherein the weight is designated as a value proportional to the inverse number of the absolute value of the calculated error.

11. A controlling method of controlling a multilayered neural network, comprising the steps of:

calculating an error between a teacher signal and an output signal;

designating a weight corresponding to the calculated error;

defining a function reflecting the value of the calculated error and the value of the designated weight; and prosecuting the learning process of the multilayered neural network so that the value of the defined function becomes minimum, wherein the weight is designated as a value proportional to a square value of the calculated error.

12. A controlling method of controlling a multilayered neural network, comprising the steps of:
    calculating an error between a teacher signal and an output signal;
    designating a weight corresponding to the calculated error;
    defining a function reflecting the value of the calculated error and the value of the designated weight; and
    prosecuting the learning process of the multilayered neural network so that the value of the defined function becomes minimum,
    wherein the weight is designated as a value proportional to the absolute value of the calculated error.

13. A medium having a program, comprising the steps of:
    designating a range of a permissible error between a teacher signal and an output signal received from a multilayered neural network;
    calculating an error between the teacher signal and the output signal;
    designated a weight corresponding to the designated range;
    defining a function reflecting the value of the calculated error and the value of the designated weight; and
    prosecuting the learning process of the multilayered neural network so that the value of the defined function becomes minimum,
    wherein the function is defined as follows:

$$E = \frac{1}{2} \frac{\sum_{k=1}^{m} s_k (t_k - o_k)^2}{\sum_{l=1}^{m} s_l}$$

where $t_k$ is a teacher signal; $o_k$ is an output signal; $s_k$ and $s_1$ are weights; k and l are variable natural numbers that are 1 or larger and m is a dimensional number of the output signal.

14. A medium having a program, comprising the steps of:
    designating a range of a permissible error between a teacher signal and an output signal received from a multilayered neural network;
    calculating an error between the teacher signal and the output signal;
    designated a weight corresponding to the designated range;
    defining a function reflecting the value of the calculated error and the value of the designated weight; and
    prosecuting the learning process of the multilayered neural network so that the value of the defined function becomes minimum,
    wherein the weight is designated as value proportional to the inverse number of the designated range.

15. A medium having a program of a multilayered neural network, comprising the steps of:
    calculating an error between a teacher signal and an output signal;
    designating a weight corresponding to the calculated error;
    defining a function reflecting the value of the calculated error and the value of the designated weight; and
    prosecuting the learning process of the multilayered neural network so that the value of the defined function becomes minimum,
    wherein the weight is designated as a value proportional to the inverse number of a square value of the calculated error.

16. A medium having a program of a multilayered neural network, comprising the steps of:
    calculating an error between a teacher signal and an output signal;
    designating a weight corresponding to the calculated error;
    defining a function reflecting the value of the calculated error and the value of the designated weight; and
    prosecuting the learning process of the multilayered neural network so that the value of the defined function becomes minimum,
    wherein the weight is designated as a value proportional to the inverse number of the absolute value of the calculated error.

17. A medium having a program of a multilayered neural network, comprising the steps of:
    calculating an error between a teacher signal and an output signal;
    designating weight corresponding to the calculated error;
    defining a function reflecting the value of the calculated error and the value of the designated weight; and
    prosecuting the learning process of the multilayered neural network so that the value of the defined function becomes minimum,
    wherein the weight is designated as a value proportional to a square value of the calculated error.

18. A medium having a program of a multilayered neural network, comprising the steps of:
    calculating an error between a teacher signal and an output signal;
    designating a weight corresponding to the calculated error;
    defining a function reflecting the value of the calculated error and the value of the designated weight; and
    prosecuting the learning process of the multilayered neural network so that the value of the defined function becomes minimum,
    wherein the weight is designated as a value proportional to the absolute of the calculated error.

19. A controlling apparatus, comprising:
    a multilayered neural network;
    means for calculating an error between a teacher signal and an output signal received from said multilayered neural network;
    means for designating a weight corresponding to the error; and
    means for defining a function reflecting the value of the error and the value of the designated weight and for prosecuting the learning process of the multilayered neural network so that the value of the function become minimum,
    wherein the function is defined as follows:

$$E = \frac{1}{2} \frac{\sum_{k=1}^{m} s_k (t_k - o_k)^2}{\sum_{l=1}^{m} s_l}$$

where $t_k$ is a teacher signal, $o_k$ is an output signal; $s_k$ and $s_1$ are weights; k and l are variable natural numbers that are 1 or larger and m is a dimensional number of the output signal.

20. A controlling method of controlling a multilayered neural network, comprising the steps of:

calculating an error between a teacher signal and an output signal;

designating a weight corresponding to the calculated error;

defining a function reflecting the value of the calculated error and the value of the designated weight; and prosecuting the learning process of the multilayered neural network so that the value of the defined function becomes minimum, wherein the function is defined as follows:

$$E = \frac{1}{2} \frac{\sum_{k=1}^{m} s_k(t_k - o_k)^2}{\sum_{l=1}^{m} s_l}$$

where $t_k$ is a teacher signal; $o_k$ is an output signal; $s_k$ and $s_1$ are weights; k and 1 are variable natural numbers that are 1 or larger and m is a dimensional number of the output signal.

21. A medium having a program of a multilayered neural network, comprising the steps of:

calculating an error between a teacher signal and an output signal;

designating a weight corresponding to the calculated error;

defining a function reflecting the value of the calculated error and the value of the designated weight; and prosecuting the learning process of the multilayered neural network so that the value of the defined function becomes minimum, wherein the function is defined as follows:

$$E = \frac{1}{2} \frac{\sum_{k=1}^{m} s_k(t_k - o_k)^2}{\sum_{l=1}^{m} s_l}$$

where $t_k$ is a teacher signal; $o_k$ is an output signal; $s_k$ and $s_1$ are weights; k and 1 are variable natural numbers that are 1 or larger and m is a dimensional number of the output signal.

* * * * *

UNITED STATES PATENT AND TRADEMARK OFFICE
CERTIFICATE OF CORRECTION

PATENT NO. : 5,909,676

DATED : June 1, 1999

INVENTOR(S) : Kano

It is certified that error appears in the above-identified patent and that said Letters Patent is hereby corrected as shown below:

Title page, in the Abstract, delete in its entirety, and replace with:

--An error between a teacher signal and an output signal is calculated for each output signal of the multilayered neural network. Weight S for each output signal is designated to correspond to the calculated errors. A function is defined to be the sum of the squares of the errors multiplied by the corresponding weight S. A learning process is executed so that the value of the function becomes minimum. The function is set to reflect the problem or situation.--

Signed and Sealed this

Seventh Day of December, 1999

*Attest:*

Q. TODD DICKINSON

*Attesting Officer*     *Acting Commissioner of Patents and Trademarks*